United States Patent
Stewart et al.

(10) Patent No.: US 9,951,995 B2
(45) Date of Patent: Apr. 24, 2018

(54) HEAT EXCHANGER WITH SELF-RETAINING BYPASS SEAL

(71) Applicant: Dana Canada Corporation, Oakville (CA)

(72) Inventors: Nikolas S. Stewart, Halton Hills (CA); Colin A. Shore, Hamilton (CA); Lee M. Kinder, Oakville (CA)

(73) Assignee: Dana Canada Corporation, Oakville (CA)

( * ) Notice: Subject to any disclaimer, the term of this patent is extended or adjusted under 35 U.S.C. 154(b) by 396 days.

(21) Appl. No.: 14/873,270

(22) Filed: Oct. 2, 2015

(65) Prior Publication Data

US 2016/0097596 A1 Apr. 7, 2016

Related U.S. Application Data

(60) Provisional application No. 62/059,265, filed on Oct. 3, 2014.

(51) Int. Cl.
*F28F 9/02* (2006.01)
*F28D 1/02* (2006.01)
(Continued)

(52) U.S. Cl.
CPC ........ *F28D 1/0233* (2013.01); *F02B 29/0462* (2013.01); *F28D 1/05366* (2013.01);
(Continued)

(58) Field of Classification Search
CPC .. F02B 29/0462; F28D 1/0233; F28D 9/0056; F28D 1/05366; F28D 2021/0082; F28F 9/26; F28F 9/005; F28F 3/025; F28F 1/128; F28F 1/045; F28F 2009/029; F28F 2280/06

See application file for complete search history.

(56) References Cited

U.S. PATENT DOCUMENTS 2,221,937 A    11/1940  Astle
3,759,308 A *   9/1973  Gebauer ................ B01D 1/221
                                              159/13.1

(Continued)

FOREIGN PATENT DOCUMENTS

JP    S63116092 A    5/1988
JP    2006292307 A   10/2006

(Continued)

*Primary Examiner* — Claire Rojohn, III
(74) *Attorney, Agent, or Firm* — Marshall & Melhorn, LLC

(57) ABSTRACT

A gas/liquid heat exchanger comprises a stack of flat tubes, defining liquid flow passages. Spaces between the flat tubes define gas flow passages, with the sides of the core having an irregular comb-like arrangement. The heat exchanger further comprises a housing having side covers over the sides of the core, and being spaced from the sides of the core. The core has at least one portion of reduced width, so as to provide channels extending throughout the height of the core. The heat exchanger further comprises a pair of side seals at least partly received in the gap between the side cover of the housing and the core, and more particularly in the channels along the sides of the core. The side seal extends throughout the height of the core and has a thickness which is greater than that of the gap.

18 Claims, 26 Drawing Sheets

(51) Int. Cl.
    *F28D 1/053* (2006.01)
    *F28F 1/04* (2006.01)
    *F28F 1/12* (2006.01)
    *F02B 29/04* (2006.01)
    *F28F 3/02* (2006.01)
    *F28F 9/00* (2006.01)
    *F28F 9/26* (2006.01)
    *F28D 9/00* (2006.01)
    *F28D 21/00* (2006.01)

(52) U.S. Cl.
    CPC ............ *F28D 9/0056* (2013.01); *F28F 1/045* (2013.01); *F28F 1/128* (2013.01); *F28F 3/025* (2013.01); *F28F 9/005* (2013.01); *F28F 9/26* (2013.01); *F28D 2021/0082* (2013.01); *F28F 2009/029* (2013.01); *F28F 2280/06* (2013.01)

(56) References Cited

U.S. PATENT DOCUMENTS

| | | | |
|---|---|---|---|
| 4,219,079 A | 8/1980 | Sumitomo | |
| 4,377,204 A | 3/1983 | Johansson | |
| 4,679,619 A * | 7/1987 | Wohrl | F16J 15/3288 165/159 |
| 4,735,260 A * | 4/1988 | Wohrl | F28D 7/06 165/135 |
| 4,742,866 A * | 5/1988 | Yamanaka | F16N 39/02 165/167 |
| 4,781,248 A * | 11/1988 | Pfeiffer | F28D 9/005 165/166 |
| 4,781,388 A * | 11/1988 | Wohrl | F01D 11/005 165/159 |
| 5,392,849 A | 2/1995 | Matsunaga et al. | |
| 5,443,115 A * | 8/1995 | Pedersen | F28F 3/083 165/167 |
| RE35,890 E * | 9/1998 | So | F28F 1/105 165/109.1 |
| 5,806,581 A | 9/1998 | Haasch et al. | |
| 6,273,183 B1 | 8/2001 | So et al. | |
| 6,976,531 B2 * | 12/2005 | Martin | F28D 9/0043 165/167 |
| 7,004,237 B2 | 2/2006 | Mathur et al. | |
| 8,016,025 B2 * | 9/2011 | Brost | F02B 29/0462 165/149 |
| 8,453,721 B2 | 6/2013 | Mathur et al. | |
| 2004/0003916 A1 * | 1/2004 | Nash | F28D 9/0043 165/153 |
| 2006/0219394 A1 * | 10/2006 | Martin | F28D 9/0043 165/157 |
| 2008/0185136 A1 * | 8/2008 | Vastine | F02B 29/0462 165/283 |
| 2013/0133866 A1 * | 5/2013 | Kinder | F28D 9/0056 165/151 |
| 2013/0133869 A1 * | 5/2013 | Kinder | F28F 9/02 165/173 |
| 2014/0034276 A1 * | 2/2014 | Persson | F28F 3/10 165/167 |
| 2014/0158328 A1 | 6/2014 | Persson et al. | |
| 2015/0107810 A1 * | 4/2015 | Drankow | F28F 9/0219 165/168 |
| 2015/0377562 A1 * | 12/2015 | Buckrell | F28F 1/40 165/181 |
| 2016/0097596 A1 * | 4/2016 | Stewart | F28D 1/0233 165/175 |
| 2016/0104922 A1 * | 4/2016 | Hoefler | H01M 10/625 429/120 |
| 2016/0128238 A1 * | 5/2016 | Shedd | F25B 23/006 361/679.47 |
| 2016/0195341 A1 * | 7/2016 | Kominami | F24H 1/009 165/293 |
| 2016/0356205 A1 * | 12/2016 | Braun | F02B 29/0443 |
| 2017/0038162 A1 * | 2/2017 | Taylor | F28D 1/0233 |
| 2017/0122678 A1 * | 5/2017 | Richter | F28F 9/001 |

FOREIGN PATENT DOCUMENTS

WO   WO2014132554 A1   9/2014
WO   WO2015164968 A1   11/2015

* cited by examiner

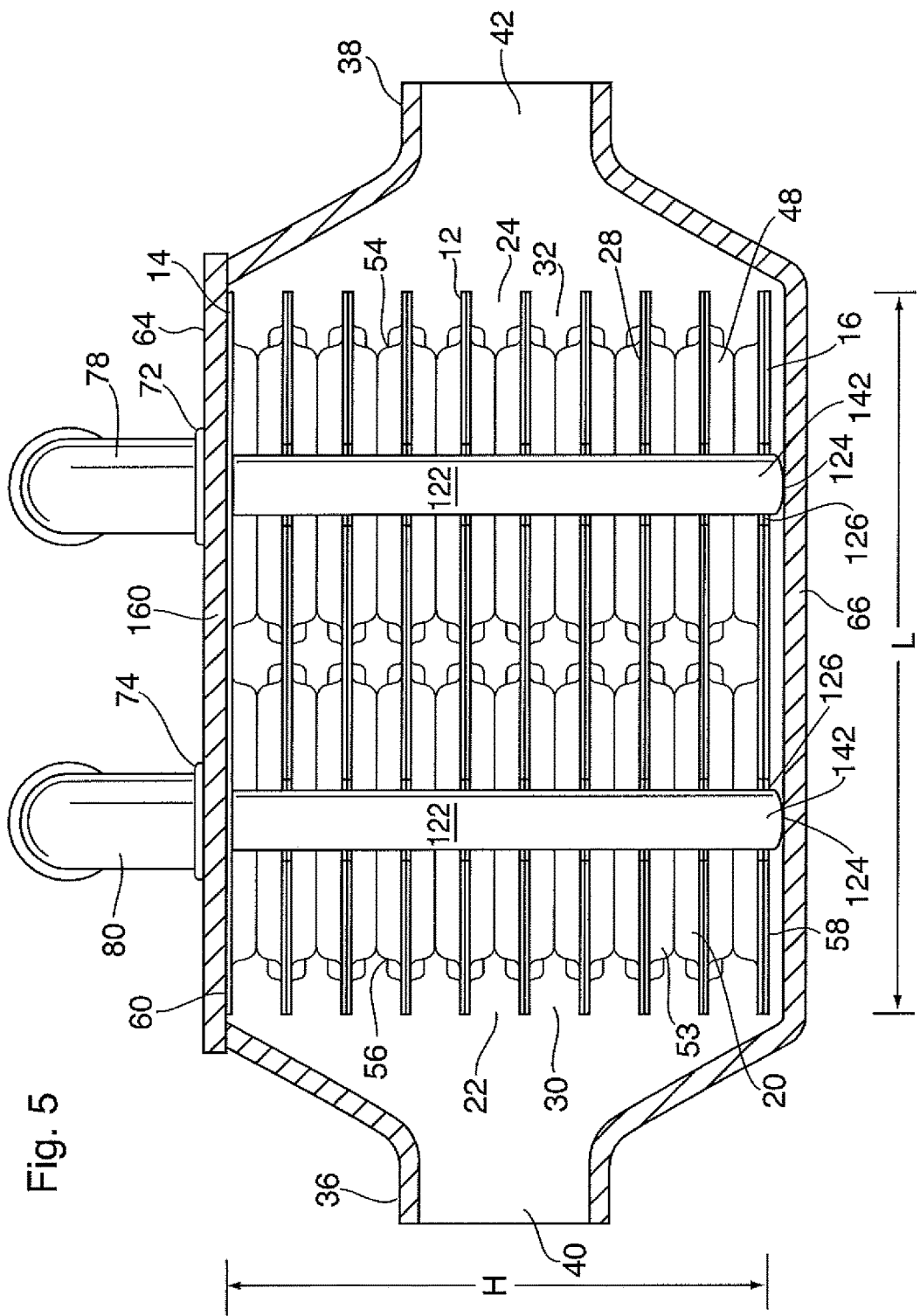

HEAT EXCHANGER WITH SELF-RETAINING BYPASS SEAL

CROSS-REFERENCE TO RELATED APPLICATION

This application claims priority to and the benefit of U.S. Provisional Patent Application No. 62/059,265 filed Oct. 3, 2014, the contents of which are incorporated herein by reference.

FIELD OF THE INVENTION

The invention generally relates to heat exchangers for cooling a hot gas with a liquid coolant, and particularly to gas-liquid charge air coolers having a housing enclosing a heat exchanger core.

BACKGROUND OF THE INVENTION

It is known to use gas-liquid heat exchangers to cool compressed charge air in turbocharged internal combustion engines or in fuel cell engines, or to cool hot engine exhaust gases. For example, compressed charge air is typically produced by compressing ambient air. During compression, the air can be heated to a temperature of about 200° C. or higher, and must be cooled before it reaches the engine.

Various constructions of gas-cooling heat exchangers are known. For example, gas-cooling heat exchangers commonly have an aluminum core comprised of a stack of tubes or plate pairs, with each tube or plate pair defining an internal coolant passage. The tubes or plate pairs are spaced apart to define gas flow passages which are typically provided with turbulence-enhancing inserts to improve heat transfer from the hot gas to the liquid coolant.

In some gas-liquid charge air coolers, the aluminum core is enclosed within a housing, which is typically formed from a dissimilar material such as plastic. The housing typically includes coolant inlet and outlet openings which are sealingly connected to the coolant passages within the tubes or plate pairs. The housing also includes gas inlet and outlet openings and provides manifold spaces for the gas flow, and the gas flow passages of the core are open to the interior of the housing.

Typically there are gaps between the heat exchanger core and the housing. Along the sides of the core, the presence of these gaps is due partly to spacing between the tubes or plate pairs and the interior of the housing, and partly due to spacing between the edges of the turbulence-enhancing inserts and the interior of the housing. If left open, the gaps along the sides of the core will permit excessive bypass flow of the hot charge air, reducing the efficiency of the heat exchanger. Therefore, it is common for the housing to include bypass blocking elements having a comb-like profile with fingers extending into the spaces between the tubes or plate pairs. A heat exchanger with bypass blocking elements of this type is described in commonly assigned U.S. Provisional Patent Application No. 61/985,588 filed on Apr. 29, 2014, which is incorporated herein by reference in its entirety.

Due to the irregular shape of the core, it is difficult to provide a bypass seal which effectively blocks bypass flow, which is simple to manufacture and which will remain in place during manufacture and use of the heat exchanger.

There remains a need for gas-cooling heat exchangers which provide high reliability while avoiding excessive material and/or manufacturing costs.

SUMMARY OF THE INVENTION

In an embodiment, there is provided a gas/liquid heat exchanger comprising a core having a length, a height, and a pair of opposed sides extending throughout the length and the height of the core. The core comprises a plurality of flat tubes arranged in a stack with a space provided between each adjacent pair of said flat tubes, each of the flat tubes having a hollow interior defining a liquid flow passage, and each of the spaces defining a gas flow passage. Each of the flat tubes has a pair of peripheral edges extending along the length of the core, the peripheral edges of the flat tubes partly defining the sides of the core. Each of the gas flow passages has a pair of open ends and a pair of opposed sides, wherein a width of each said gas flow passage is defined between the opposed sides, the opposed sides of the gas flow passages partly defining the sides of the core. The core comprises a first portion in which the flat tubes have a first width which is greater than the width of each of the gas flow passages, wherein the first width is defined between the peripheral edges of the flat tubes in said first portion. The core has a second portion in which the flat tubes have a second width which is substantially the same as the width of each of the gas flow passages, wherein the second width is defined between the peripheral edges of the flat tubes in said second portion.

The heat exchanger further comprises a housing surrounding the core. The housing comprises an inlet end portion with a gas inlet opening and an outlet end portion with a gas outlet opening, wherein the gas inlet and outlet opening communicate with the open ends of the gas flow passages of the core. The housing includes at least one side cover extending along, and spaced from, the at least one side of the core, wherein a first gap between the side cover and the side of the core in the first portion of the core is less than a second gap between the side cover and the side of the core in the second portion of the core.

The heat exchanger further comprises a side seal at least partly received in the gap between the side cover of the housing and the second portion of the core. The side seal extends throughout the height of the core and has a thickness which is greater than the first gap.

In an embodiment, each of the gas flow passages is provided with a turbulence-enhancing insert. In an embodiment, each of the turbulence-enhancing inserts comprises a corrugated fin defined by a plurality of parallel sidewalls extending along the length of the core, wherein the sidewalls have crests at their tops and bottoms at which they are joined to each other and to adjacent ones of said flat tubes. In an embodiment, each of the corrugated fins has a pair of side edges between which a width of the corrugated fin is defined, wherein at least one of the side edges of the corrugated fin is defined by an endmost sidewall of said corrugated fin, and wherein the endmost sidewall is substantially free of perforations and defines one of the opposed sides of one of the gas flow passages.

In an embodiment, each of the side edges of the corrugated fin is defined by one of said endmost sidewalls of the corrugated fin. In an embodiment, each of said corrugated fins has a width which defines the width of the gas flow passage in which it is provided, such that each of the opposed sides of each of the gas flow passages is defined by one of the endmost sidewalls of said corrugated fin.

In an embodiment, each of the flat tubes comprises a pair of core plates having a planar peripheral flange surrounding a raised central area, and wherein said peripheral edges of the tubes are defined by portions of said planar peripheral flange extending along the length of the core. In an embodiment, each of the raised central areas of the core plates and each of the liquid flow passages of the flat tubes have a width in the second portion of the core which is less than a width in the first portion of the core. In an embodiment, the planar peripheral flanges include inwardly extending portions in the second portion of the core. In an embodiment, the inwardly extending portions extend inwardly by a maximum amount which is substantially equal to a width of the planar peripheral flange along the first portion of the core. In an embodiment, each of the inwardly extending portions includes an interlocking element which is adapted to engage and retain an inner edge of the side seal.

In an embodiment, the second portion of the core has a length which is less than a length of the first portion of the core.

In an embodiment, the second portion forms a recessed channel extending throughout substantially the entire height of the core.

In an embodiment, the core further comprises a top and a bottom, and wherein the housing includes a top cover provided over the top of the core, a bottom cover provided over the bottom of the core, and a pair of said side covers over the sides of the core. In an embodiment, the bottom of the core is spaced from the bottom cover of the housing and a bottom seal is provided between the bottom of the core and the bottom cover of the housing. In an embodiment, the top of the core is spaced from the top cover of the housing and a top seal is provided between the top of the core and the top cover of the housing. In an embodiment, the top seal or the bottom seal is partly embedded in a groove in the top cover or the bottom cover of the housing.

In an embodiment, the seal is resilient and has an uncompressed thickness which is greater than said second gap. In an embodiment, the seal includes a plurality of legs having ends which engage the core in the second portion thereof. In an embodiment, the seal has a U-shape with two of said legs. In an embodiment, the second portion of the core includes interlocking elements which engage and retain the ends of the legs. In an embodiment, the ends of the legs have portions of increased thickness which are adapted to be engaged and retained by the interlocking elements.

In an embodiment, the side seals, the top seal and the bottom seal comprise a continuous seal member which extends along the top, bottom and sides of the core. In an embodiment, all portions of the continuous seal lie in a single transverse plane. In an embodiment, the continuous seal comprises an elongate, resilient member. In an embodiment, the continuous seal includes wrappable corner portions which are adapted to wrap around corners between the sides and the adjoining top and bottom of the core. In an embodiment, the wrappable corner portions comprise notches extending partly through the thickness of the continuous seal. In an embodiment, the notches are V-shaped and are open toward the core.

In an embodiment, the heat exchanger includes two or more of said side seals, which are spaced apart along the length of the core, and wherein the core comprises two of said second portions in which the flat tubes have a second width which is substantially the same as the width of each of the gas flow passages.

In an embodiment, one of the opposed sides of each of the gas flow passages is defined by coolant inlet and outlet manifolds of the core.

BRIEF DESCRIPTION OF THE DRAWINGS

The invention will now be described, by way of example only, with reference to the accompanying drawings, in which:

FIG. 5 is a side view of the heat exchanger of FIG. 1, with the housing partly cut away to show the core;

DETAILED DESCRIPTION

Figure 1:
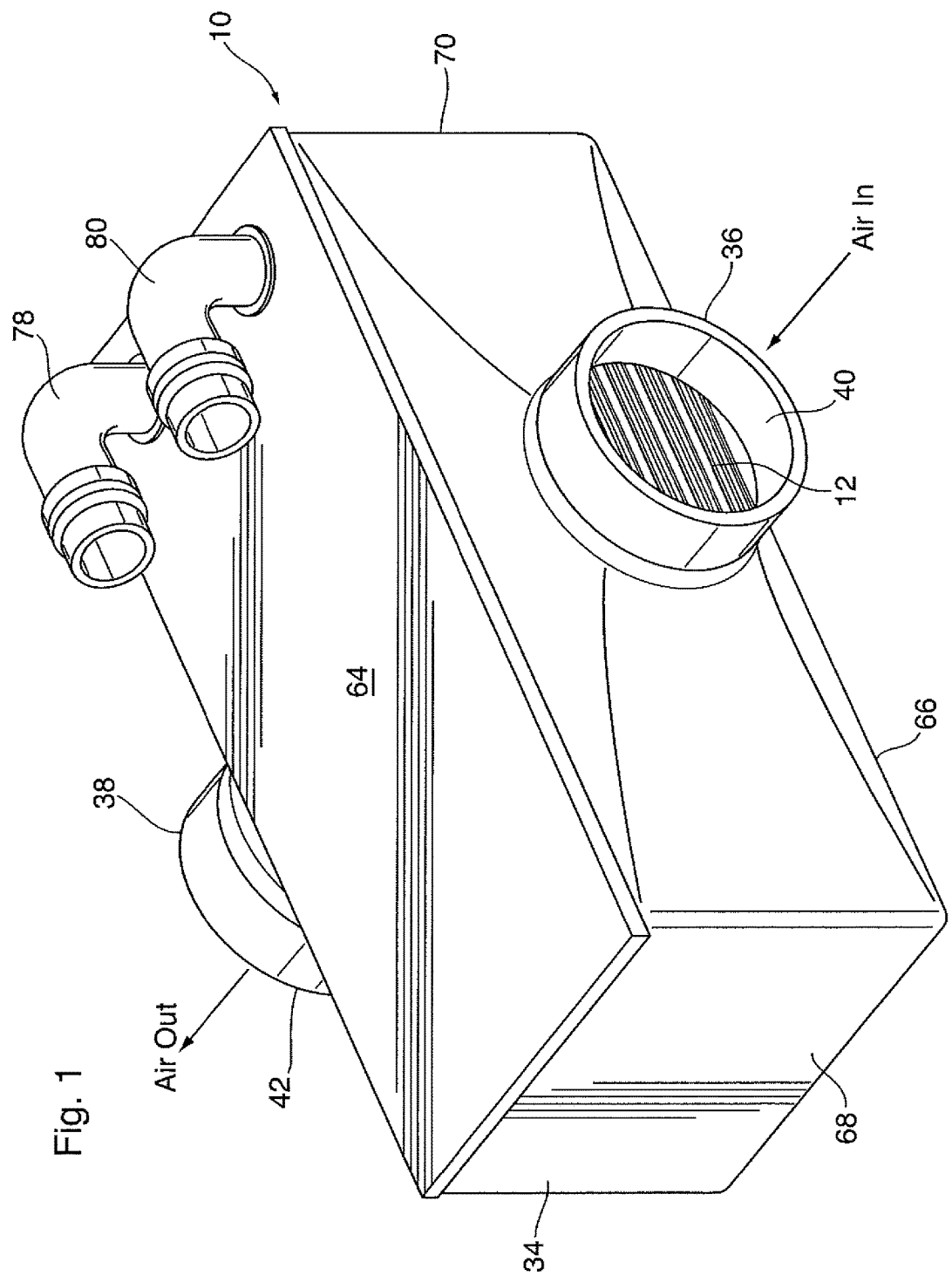
FIG. 1 is a perspective view showing the exterior of a heat exchanger according to a first embodiment disclosed herein.

A heat exchanger 10 according to a first embodiment is now described below with reference to FIGS. 1 to 5C.

Heat exchanger 10 is a charge air cooler for a motor vehicle powered by an engine requiring compressed charge air, such as a turbocharged internal combustion engine or a fuel cell engine. The heat exchanger 10 may be mounted downstream of an air compressor and upstream of an air intake manifold of the engine to cool the hot, compressed charge air before it reaches the engine. However, in some embodiments the heat exchanger 10 may be integrated with the intake manifold, as further discussed below. In the following description, the coolant circulated through the heat exchanger 10 is a liquid coolant which may be the same as the engine coolant, and which may comprise water or a water/glycol mixture.

It will be appreciated that the specific arrangement and locations of the inlet and outlet openings for air and coolant will at least partially depend on the specific configuration of a vehicle's air intake system, and will vary from one application to another.

As shown in FIGS. 1 to 5, heat exchanger 10 comprises a core 12 having a top 14, a bottom 16, first and second sides 18, 20, an inlet end 22, an outlet end 24, coolant openings 25, 27, coolant manifolds 54, 56, and gas inlet and outlet openings 30, 32 located at the inlet and outlet ends 22, 24. The core 12 has a length L defined between the inlet and outlet ends 22, 24, a width W defined between the sides 18 and 20, and a height H defined between the top 14 and bottom 16. Dimensions H and L are shown in FIG. 5, and dimensions L and W are also shown in connection with the core plate 100 in FIG. 2.

It can be seen that the first side 18 extends along the length L and height H of the core 12, as does second side 20. In the present embodiment, the overall shape of the core 12 is that of a rectangular prism in which the width W of the core 12 is greater than the length L of the core 12.

The core 12 of heat exchanger 10 will typically be comprised of a metal such as aluminum or an aluminum alloy, with the components of core 12 being joined together by brazing. As used in relation to all embodiments described herein, the term "aluminum" is intended to include aluminum and its alloys.

The structure of the core 12 is variable, and the specific construction according to the first embodiment is only one example of a possible core construction. Core 12 comprises a stack of flat tubes 48, each of the tubes 48 having a hollow interior defining a coolant flow passage 50, and with a pair of opposed peripheral edges 26, 28 extending along the length L of the core 12, wherein the peripheral edges 26, 28 of the flat tubes 48 partly define the sides 18, 20 of the core 12.

The flat tubes 48 are arranged in a stack with spaces provided between adjacent pairs of the flat tubes 48, these spaces defining a plurality of gas flow passages 52. The gas flow passages 52 extend from the inlet end 22 to the outlet end 24 of core 12, along the length L of core 12. As will be appreciated, each of the gas flow passages 52 has a pair of open ends proximate to the ends 22, 24 of core 12, and a pair of opposed sides, namely a first side 51 and second side 53 extending along the length L of the core 12. A width $W_1$ (FIG. 5B) of each of the gas flow passages 52 is defined between the opposed sides 51, 53 thereof, and the opposed sides 51, 53 of the gas flow passages 52 partly define the sides 18, 20 of the core 12.

Figure 5B:
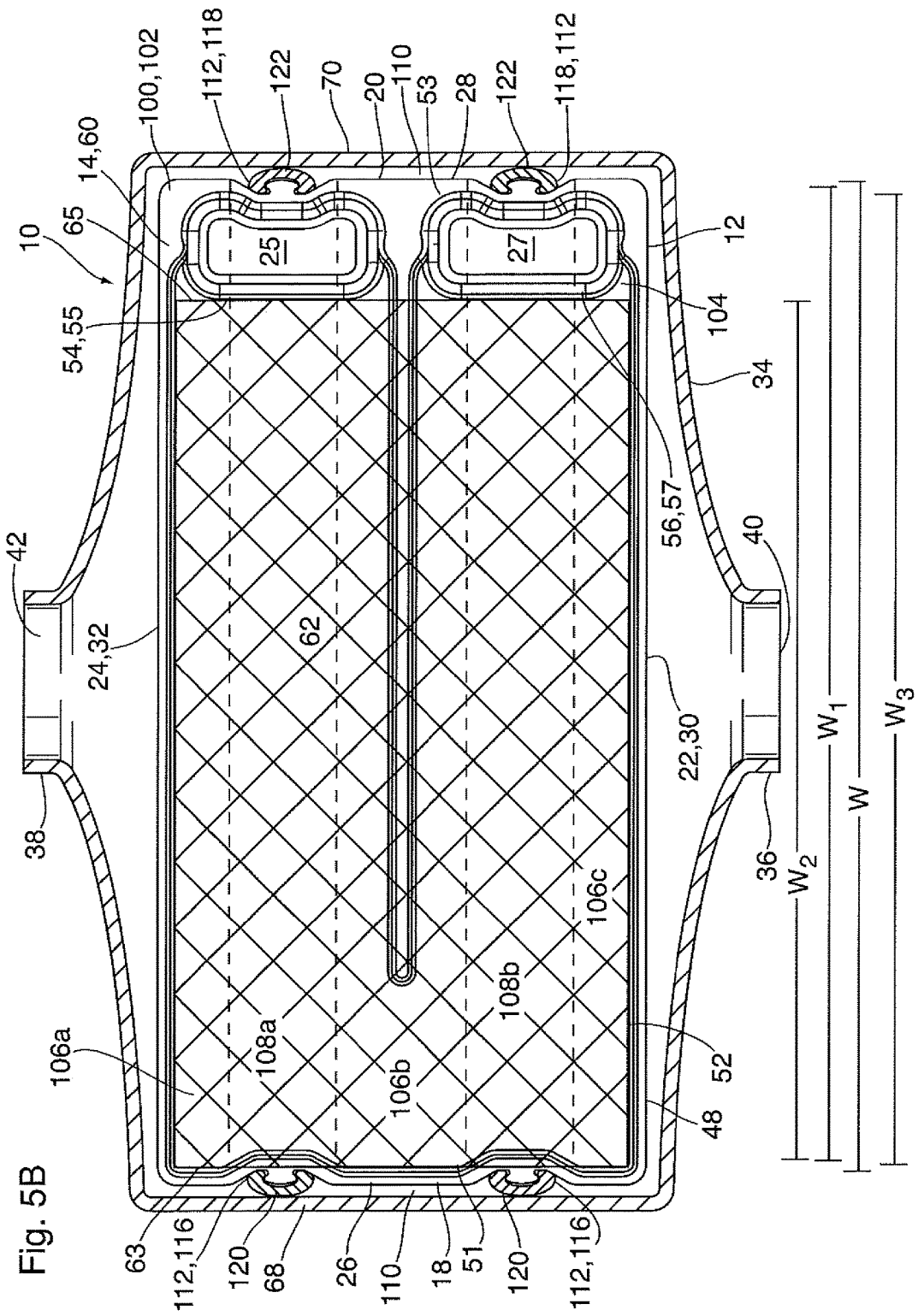
FIG. 5B is a top view of the heat exchanger of FIG. 1, sectioned along a plane parallel to the core plates.

The gas flow passages 52 extending lengthwise through core 12 may be provided with turbulence-enhancing inserts such as corrugated fins or turbulizers in order to provide increased turbulence and surface area for heat transfer, and to provide structural support for the core 12. In the illustrated embodiment, the turbulence-enhancing inserts comprise a plurality of corrugated fins 62. Each of the corrugated fins 62 has a pair of side edges 63, 65 between which the width $W_2$ of the corrugated fin 62 is defined, as shown in FIG. 5B. In some embodiments, the width $W_2$ corresponds to or is substantially the same as the width $W_1$ of the gas flow passage 52 in which it is provided. However, in the present embodiment, the width $W_2$ of each corrugated fin 62 is less than the width $W_1$ of the gas flow passage 52 in which it is provided, as will be further discussed below.

As used herein, the terms "fin" and "turbulizer" are intended to refer to corrugated turbulence-enhancing inserts having a plurality of axially-extending ridges or crests connected by sidewalls, with the ridges being rounded or flat. As defined herein, a "fin" has continuous ridges whereas a "turbulizer" has ridges which are interrupted along their length, so that axial flow through the turbulizer is tortuous. Turbulizers are sometimes referred to as offset or lanced strip fins, and examples of such turbulizers are described in U.S. Pat. No. Re. 35,890 (So) and U.S. Pat. No. 6,273,183 (So et al.). The patents to So and So et al. are incorporated herein by reference in their entireties.

The corrugated fins 62 of the present embodiment are shown as a cross-hatched area in FIG. 5B. However, the corrugated fins of the present embodiment are the same as those of the second embodiment described below, comprising a plurality of parallel sidewalls 44 extending along the length L of core 12, wherein the sidewalls 44 have crests 46 at their tops and bottoms along which they are joined to each other and to adjacent flat tubes 48. The corrugated fins 62 as illustrated in FIGS. 10, 11, 17 and 18 correspond to the corrugated fins 62 of the present embodiment.

The corrugations defined by the corrugated fin 62 are open at the ends 22, 24 of core 12. Each of the side edges 63, 65 of the corrugated fin 62 is defined by one of the endmost sidewalls 44 of the corrugated fin 62.

It can be seen from FIG. 5B that one side edge 63 of each corrugated fin 62 is located at, and extends along, the first side 51 of one of the gas flow passages 52. The other side edge 65 of each corrugated fin 62 is spaced from the second side 53 of one of the gas flow passages 52, as will be further discussed below. Along the side edges 63 of the corrugated fins 62 located at the first sides 51 of the gas flow passages 52, at least an endmost one of the sidewalls 44 is substantially free of perforations. It is advantageous that at least the endmost sidewall 44 located at the first side edge 63 of each corrugated fin 62 is substantially free of perforations so as to minimize the amount of gas which will escape from and bypass the corrugated fin 62. The opposite side edges 65 of the corrugated fins 62, located toward (but spaced from) the second sides 53 of the gas flow passages 52, may similarly be substantially free of perforations. In embodiments where it is desired to provide the sidewalls 44 with louvers or other types of perforations (not shown), at least the endmost sidewall 44 may be deformed so as to substantially close the perforations, or the corrugated fin 62 may be provided in multiple sections, including a central section with louvers or other perforations, and one or two edge sections located along side edges 63, 65 which are free from perforations.

The tubes 48 may be of various constructions, and are comprised of pairs of core plates 100 (FIG. 2), each of which has a planar peripheral flange 102 surrounding a raised central area 104. The flat tubes 48 are formed by joining together a pair of core plates 100 in face-to-face relationship, wherein the core plates 100 are sealingly joined together along their peripheral flanges 102, for example by brazing. In the assembled tube 48, the coolant flow passage 50 is defined between the raised central areas 104 of the joined plates 100 and is sealed around its edges by the joined peripheral flanges 102. The core plates 100 of the present embodiment are mirror images of one another, and may optionally be identical.

As shown, portions of said planar peripheral flanges 102 extending along the length of the core 12 define the peripheral edges 26, 28 of the flat tubes 48.

The coolant flow passages 50 of core 12 are connected by a pair of coolant manifolds 54, 56. In the illustrated embodiment, the manifolds 54, 56 are formed by providing apertured, upstanding bosses or bubbles 55, 57 (shown in FIG. 2) in each of the plates 100 making up the tubes 48, with the bosses of adjacent plate pairs being joined to form continuous manifolds 54, 56. The manifolds 54, 56 are in communication with each of the coolant flow passages 50 and extend throughout the height of the core 12, from the top 14 to the bottom 16. The lower ends of manifolds 54, 56 are closed by a bottom plate 58 which defines the bottom 16 of core 12, while the top 14 of core 12 is defined by a top plate 60 in which the coolant openings 25, 27 are defined.

Figure 2:
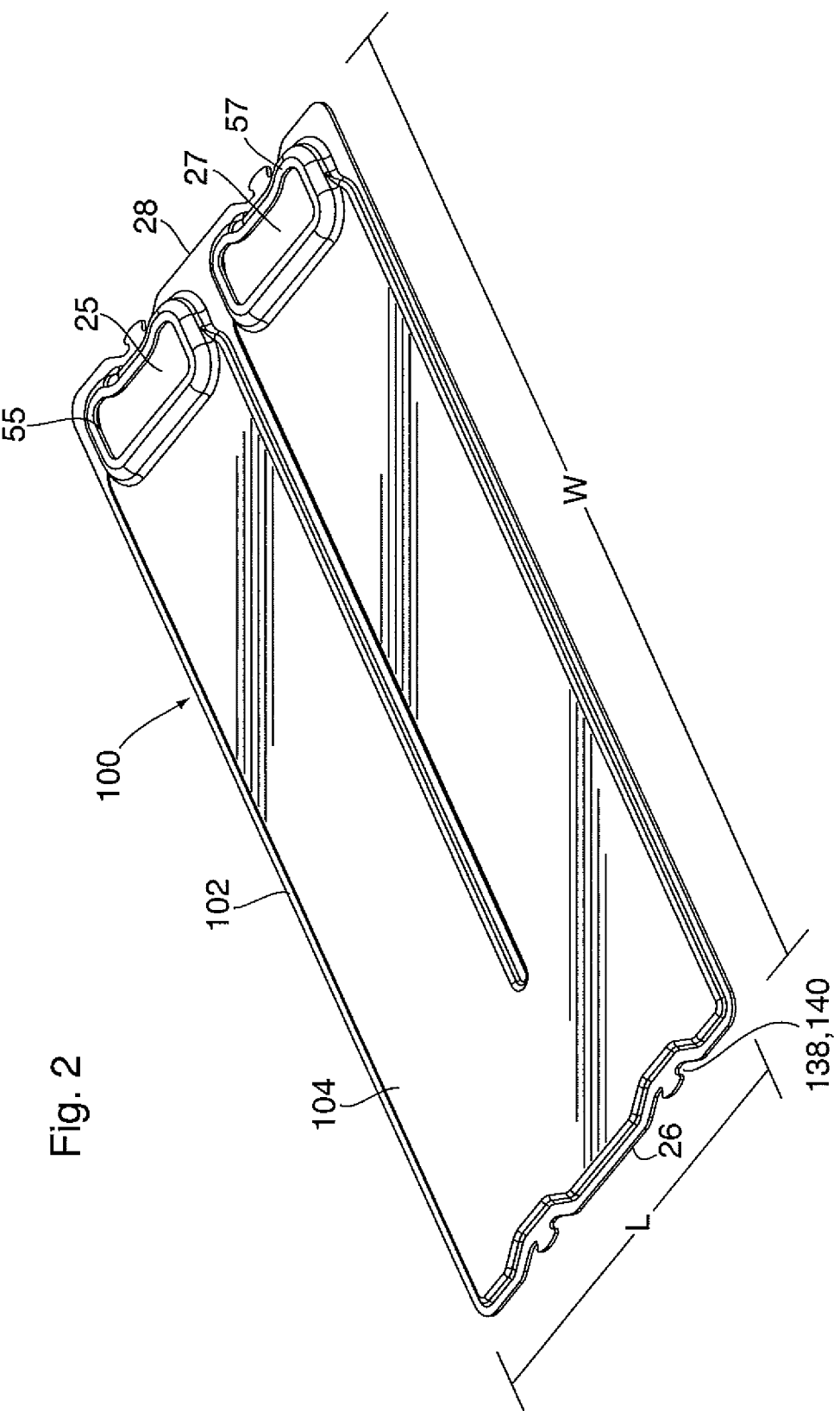
FIG. 2 is a top perspective view of a core plate of the heat exchanger of FIG. 1.

In the heat exchanger 10 according to the first embodiment, the coolant manifolds 54, 56 are both located adjacent to the second side 20 of core 12, proximate to edge 28, with the coolant flow passages 50 being U-shaped, as can be seen from FIGS. 2 and 5B. Thus, the directions of air and coolant flow in heat exchanger 10 are substantially perpendicular to one another (cross-flow arrangement). In other embodiments described herein, the coolant manifolds may be spaced apart along the length L of core 12, such that the air and coolant flow may flow in opposite directions (counter-flow arrangement) or in the same direction (co-flow arrangement).

Heat exchanger 10 further comprises a housing 34 surrounding the core 12, the housing having an inlet end portion 36 and an outlet end portion 38. The inlet end portion 36 includes a gas inlet opening 40 communicating with the gas inlet opening 30 of core 12, which is to be connected directly or indirectly to an upstream component of a vehicle engine system, such as an air compressor (not shown). The outlet end portion 38 includes a gas outlet opening 42 communicating with the gas outlet opening 32 of the core 12, which is to be directly or indirectly connected to a downstream component of a vehicle engine system, such as an intake manifold (not shown). In some embodiments, the housing 34 may comprise an intake manifold of a vehicle engine, in which case the gas inlet opening 32 of the core 12 may communicate directly with the vehicle engine (not shown). In the following description, it will be understood that references to the housing 34 will include embodiments where the housing is an intake manifold.

For ease of assembly, the housing 34 typically comprises two or more separately formed segments, for example as described in above-mentioned U.S. Patent Application No. 61/985,588. However, the specific construction of the housing 34 is not necessary to an understanding of the present invention, and therefore these details are omitted from the present discussion and from the drawings.

The housing 34 includes at least one side cover 68 or 70 extending along, and spaced from, at least one side 18 or 20 of the core 12. In the illustrated embodiment, the housing 34 is continuous and surrounds the core 12, comprising a pair of said side covers 68, 70 over the sides 18, 20 of core 12, and further comprising a top cover 64 provided over the top 14 of core 12, and a bottom cover 66 provided over the bottom 16 of core 12. Together with the end portions 36, 38, the covers 64, 66, 68, 70 of housing 34 form a substantially continuous enclosure about the core 12, except at inlet and outlet openings for the gas and coolant.

In the present embodiment, the top cover 64 of housing 34 may be separate from the remainder of housing 34, such that the core 12 may be dropped into the housing 34, and the top cover 64 is then sealed to the remainder of housing 34.

Optionally, in the present embodiment, the top cover 64 is integrated with the core 12, comprising a relatively thick, flat flange plate 160 (FIG. 5) which may be comprised of aluminum and has its bottom face brazed to the top plate 60 of the core 12. The flange plate 160 is provided with a pair of coolant openings 72, 74 which communicate with the coolant manifolds 54, 56, and the top face of the flange plate 160 is provided with a pair of coolant fittings 78, 80. The edges of the flange plate 160 will be sealingly connected to the remainder of housing 34 by any convenient means, such as mechanical connection, brazing or welding. The terms "top" and "bottom" are used in reference to the housing 34 as terms of convenience, and do not necessarily indicate that the housing 34 is required to have any particular orientation in use.

The coolant openings 25, 27 of core plates 100 and top plate 60 provide communication between manifolds 54, 56 and coolant openings 72, 74 which are provided in the top cover 64 of housing 34 (i.e. the flange plate 160 in the present embodiment). Furthermore, coolant fittings 78, 80 communicate with the respective coolant openings 72, 74, and are adapted for connection to coolant conduits (not shown) in a coolant circulation system (not shown).

In the first embodiment, both sides 18, 20 of core 12 are spaced from the respective side covers 68, 70 of housing 34, and the bottom 16 of core 12 is spaced from the bottom cover 66 of housing 34. In this particular embodiment, as mentioned above, the top 14 of core 12 is in direct contact with the flange plate 160 which defines the top cover 64 of housing 34. In other embodiments, the spacing between top 14 of core 12 and top cover 66 may be so small as to be negligible in terms of bypass flow.

The corrugated fins 62 provide the core 12 with a certain amount of resistance to gas flow, and therefore the gas to be cooled will tend to bypass the corrugated fins 62 and flow through any spaces located outside the side edges 63, 65 of the corrugated fins 62, including any spaces between the housing 34 and the core 12 which permit free flow between the gas inlet opening 40 and the gas outlet opening 42 of housing 34, such as the spaces between the housing 34 and core 12 mentioned above. Similarly, due to the location of manifolds 54, 56 within the gas flow passage 52, the gas to be cooled will tend to flow around the outside edges of the manifolds 54, 56, through the space between core 12 and the housing 34.

Figure 3:
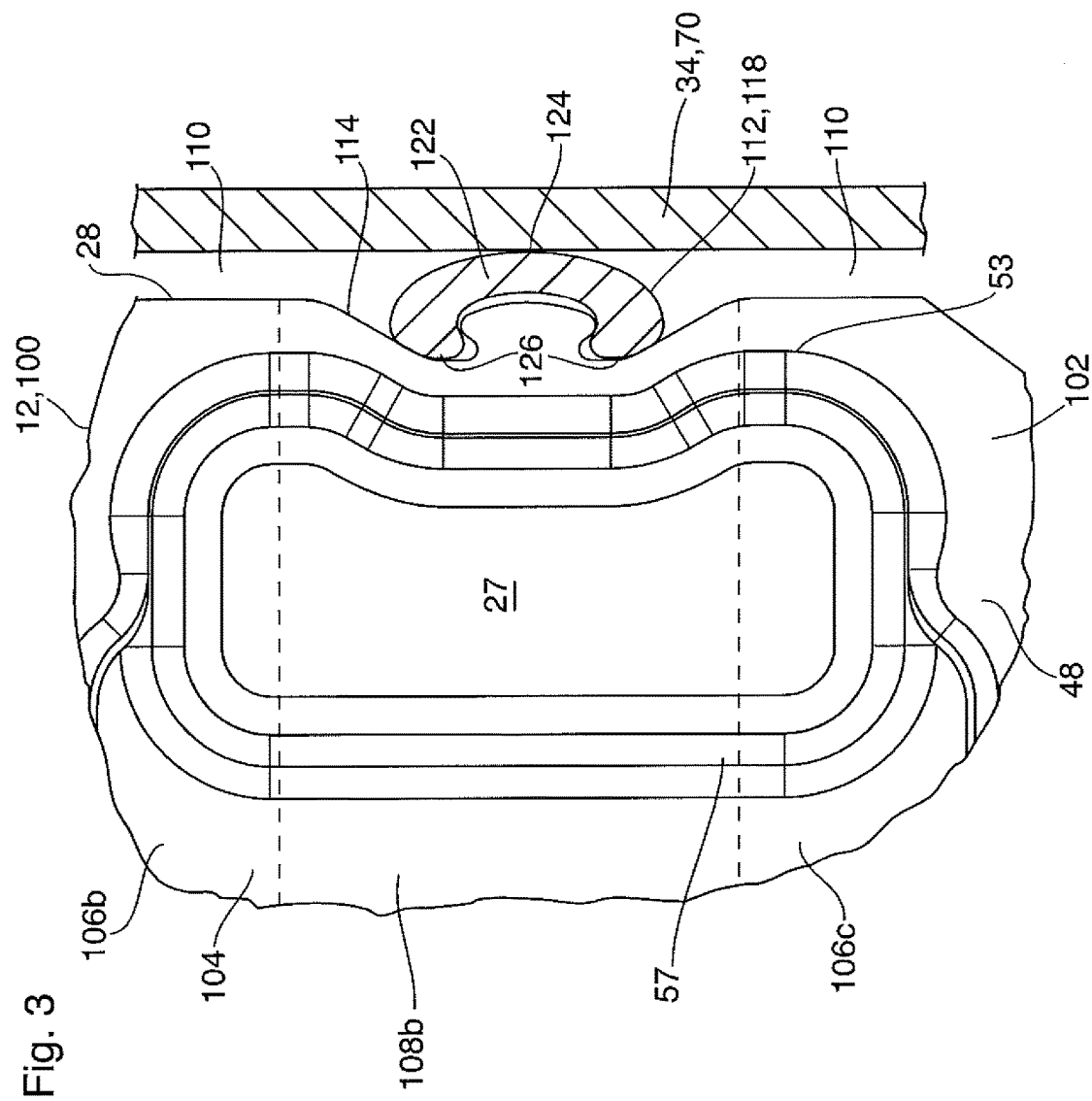
FIG. 3 is a close-up view of an edge of the core, and also showing the side seal and a side cover of the housing.
Figure 4:
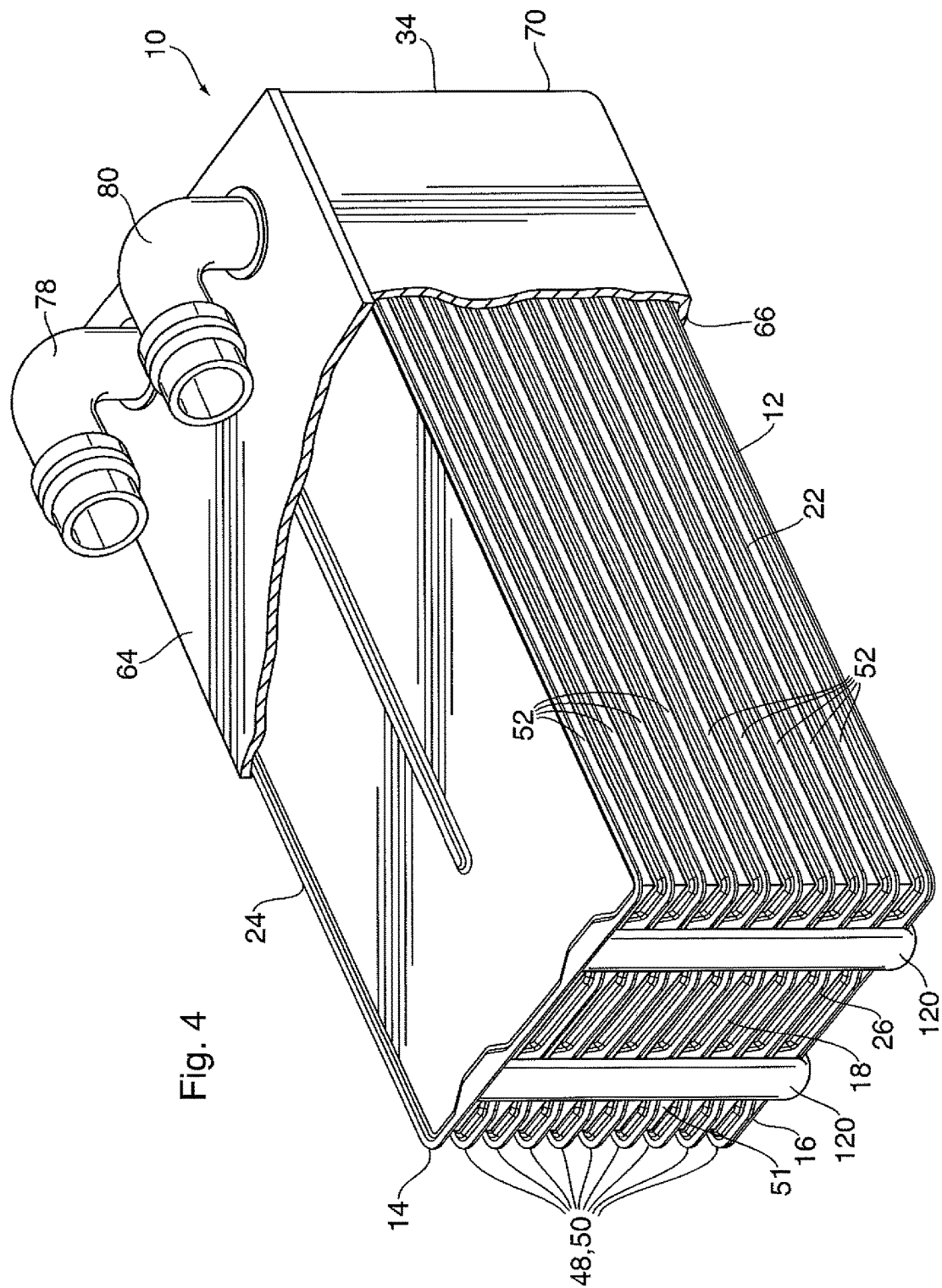
FIG. 4 is a perspective view of the heat exchanger of FIG. 1, with the housing partially cut away.

The spaces between the core 12 and the side covers 68, 70 of housing 34 are best seen in FIGS. 3 and 5B. This spacing is due partly to spacing between the peripheral edges 26, 28 of tubes 48 and the side covers 68, 70 of housing 34, partly to spacing between the side edge 63 of the corrugated fins 62 and the side cover 68 of housing 34, and partly to spacing between the outside edges of coolant inlet and/or outlet manifold 54, 56 and the side cover 70 of housing 34. If left open, these spaces will permit excessive bypass flow of the gas, reducing the efficiency of the heat exchanger 10.

In the core construction of the first embodiment, the peripheral edges 26, 28 of the tubes 48 are comprised of the peripheral flanges 102 of the core plates 100 from which the tubes 48 are formed. As can be seen in FIG. 5B, the side edges 63 of corrugated fins 62 do not extend to the peripheral edges 26 of the peripheral flanges 102 of tubes 48. For this reason, the first side 18 of core 12 has an irregular comb-like shape. As discussed above, it is difficult to achieve a reliable seal against this irregular surface.

Similarly, the coolant inlet and outlet manifolds 54, 56 do not extend to the peripheral edges 28 of peripheral flanges 102 along the second side 20 of core 12 and, for this reason, the second side 20 has an irregular comb-like shape which is difficult to seal.

According to the first embodiment, the difficulty in forming seals against the first and second sides 18, 20 of core 12 is overcome by altering the shapes of the first and second sides 18, 20. In this regard, the core 12 comprises at least one first portion 106 in which the flat tubes 48 have width W (measured between the peripheral edges 26 and 28 in said first portion 106 and shown in FIGS. 2 and 5B) which is greater than the width $W_1$ of each of the gas flow passages 52, defined above.

In the first portions 106 of core 12, the corrugated fins 62 are provided only between portions of tubes 48 through which the coolant circulates, these portions being defined by the raised central portions 104 of core plates 100. Therefore, along the first side 18 of core 12, the side edges 63 of corrugated fins 62 terminate at or proximate to the edges of the coolant flow passages 50. Similarly, at the second side 20 of core 12, the manifolds 54, 56 are provided in portions of tubes 48 through which the coolant circulates, and therefore, along the second side 20 of core 12, the outer edges of the manifolds 54, 56 are located at or proximate to the edges of the coolant flow passages 50.

Therefore, in the first portions 106 of the core 12, the sealed peripheral flanges 102 of the core plates 100 project outwardly beyond the edges 63 of the corrugated fins 62 along first side 18, and similarly the sealed peripheral flanges 102 project outwardly beyond the outer edges of the manifolds 54, 56 along second side 20, producing the irregular comb-like shape along both the first and second sides 18, 20, as described above. Three such first portions 106 are included in the present embodiment, and are labelled 106a, 106b and 106c in FIG. 5B.

As also shown in FIG. 5B, the core 12 according to the present embodiment also includes at least one second portion 108 in which the flat tubes 48 have a width $W_3$ (measured between the peripheral edges 26 and 28 in the second portions 108 and shown in FIG. 5B) which is substantially the same as the width $W_1$ of each of the gas flow passages 52. The present embodiment includes two of said second portions, labelled 108a and 108b in FIG. 5B.

These narrower second portions 108 of the core 12 are formed by extending the peripheral flanges 102 inwardly toward the middles of the flat tubes 48 in these second portions 108. This brings about a local reduction in the width of the raised central portions 104 of core plates 100 and a corresponding reduction in width of the coolant flow passages 50 in second portions 108, while the width $W_1$ of the gas flow passages 52 and the width $W_2$ of the corrugated fins 62 are the same throughout the first and second portions 106, 108. The reduction in width in the second portions 108 is sufficient such that the width $W_3$ between the peripheral edges 26, 28 in at least a part of each second portion 108 is substantially the same as the width W of the gas flow passages 52, within acceptable manufacturing tolerances. It will be seen from the drawings that the width $W_3$ corresponds to the minimum width between the peripheral edges 26, 28 within second portions 108, and that the width of the peripheral flange 102 is somewhat variable in the second portions 108. It is important to note that a certain minimum width of the peripheral flange 102 must be maintained within second portions 108 so as to ensure reliable sealing of the coolant flow passages 50, and this requirement accounts for the narrowing of the coolant flow passages 50 in these areas.

With the above configuration, as best seen in FIGS. 3 and 5B, there is a first gap 110 between the side cover 70 and the second side 20 of the core 12 in the first portions 106 of the core 12, the first gap 110 being less than a second gap 112 between the side cover 70 and the second side 20 of core 12 in the second portions 108 of the core 12. Similar first and second gaps 110, 112 exist between the first side 18 of core 12 and the side cover 68 of housing as shown in FIG. 5B. It will be appreciated that the second gap 112 is the distance between the housing 34 and each second portion 108 of core 12, and more specifically between the housing 34 and those parts of the second portions 108 in which the width $W_3$ between the peripheral edges 26, 28 is substantially the same as the width W of the gas flow passages 52, within acceptable manufacturing tolerances.

The locations and relative lengths of the first and second portions 106, 108 of core 12 along the length L of core 12 are variable. For example, in the present embodiment, the second portions 108a, 108b are located close to the ends of core 12, and three portions 106a, 106b and 106c are provided. In other embodiments there may be one second portion 108 which may be located anywhere along the length L of the core 12.

In the present configuration, the length of the first portions 106 (i.e. the combined lengths of 106a, 106b and 106c) is greater than the individual and combined lengths of the second portions 108a, 108b, wherein the lengths of portions 106, 108 are measured along the length L of core 12. The lengths of portions 106, 108 can be varied from those shown. However, it will be apparent from the description below that making the second portions 108 shorter than the first portions 106 is desirable for a number of reasons.

As mentioned above, the second portions 108 of core 12 are formed by inwardly extending portions 114 of the peripheral flanges 102 of the core plates 100. The maximum amount of the inward extension of the peripheral flange 102 may be approximately equal to the width of the peripheral flange 102. As can be seen from FIGS. 3 and 5B, the inward extension of flanges 102 along the first side 18 of core 10 results in an edge portion of the corrugated fin 62 extending beyond the raised central areas 104 of core plates 100 and the coolant flow passages 50, due to the reduction in width of central areas 104 and coolant flow passages 50, as shown at the left side of FIG. 5B. Thus, the side edges 63 of corrugated fins 65 are unsupported in the inwardly extending portion 114 of peripheral flange 102, leaving small gaps 98 (shown in FIG. 11) between the unsupported portion of corrugated fin 62 and the adjacent flat tube 48. The inventors have found that these gaps 98 do not result in significant bypass gas flow due to their small size, and due to the tortuous pathway which the gas must follow in order to flow through these gaps 98. It will be appreciated that the appearance of the core 12 of the heat exchanger 10, as shown at the left side of FIG. 5B, when sectioned in a plane extending through the height H of the core 12, will have a substantially identical appearance as the core 12 of heat exchanger 200 shown in FIGS. 11 and 12.

Figure 14:
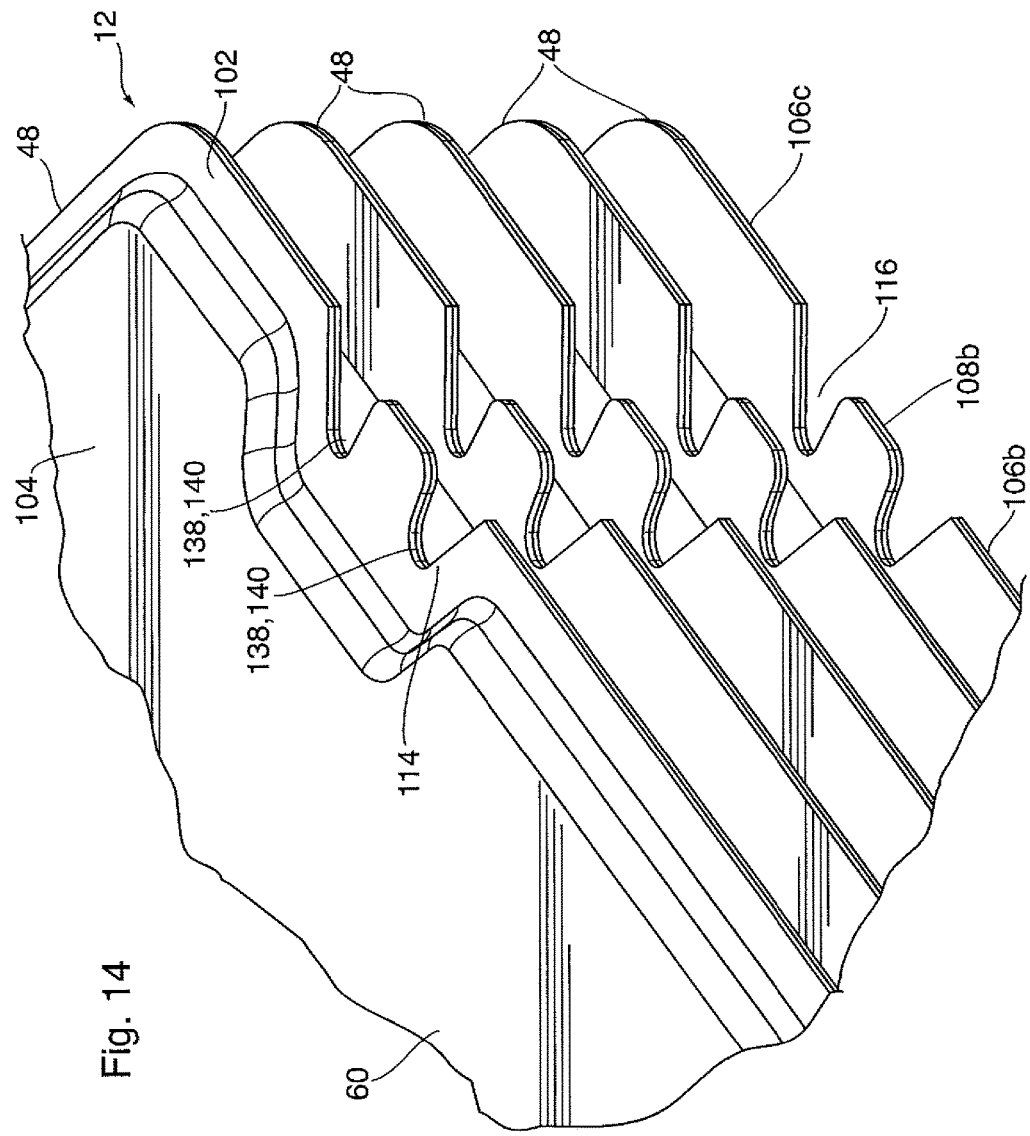
FIG. 14 is a close-up view of the edge of the core with the side seal removed.

In the first embodiment, the provision of the narrower second portions 108 of core 12 results in the formation of relatively narrow side channels 116, 118 extending throughout substantially the entire height H of core 12. These side channels 116, 118 extend at substantially right angles to the length L of core 12, although it will be appreciated that the side channels 116, 118 may instead be angled relative to length L in some embodiments. A close-up of one of the side channels 116 is shown in FIG. 14, and the side channels 116, 118 according to the present embodiment are identical in appearance. At least one side channel 116, 118 is provided along each of the sides 18, 20 of core 12. For example, in the heat exchanger 10 according to the first embodiment, there are two side channels 116 along the first side 18 of core 12, and two side channels 118 along the second side 20 of core 12.

Heat exchanger 10 further comprises at least one side seal 120 and at least one side seal 122. Each side seal 120 is at least partly received in the second gap 112 and in side channel 116 along the first side 18 of the core 12, and each side seal 122 is at least partly received in the second gap 112 and in side channel 118 along the second side 20 of core 12. The side seals 120, 122 extend throughout the height H of core 12 and the heights of side channels 116, 118.

The following description will focus primarily on the features of each side seal 120, it being appreciated that each side seal 122 is identical in the present embodiment. In the following description, reference may be made to the side seals of the second embodiment, as shown in FIGS. 16-19, which are identical to the side seals 120, 122 except as specifically noted below.

It can be seen that side seal 120 has at least one outer edge 124 received in substantially sealed engagement against the side cover 68 of housing 34, and at least one inner edge 126 received in substantially sealed engagement against the first side 18 of core 12 in one of the second portions 108 thereof, i.e. against the peripheral edges 26 of the flat tubes 48 and the endmost sidewalls 44 located along the side edges 63 of the corrugated fins 62. As can be seen from FIG. 16, the side seals 120, 122 have a thickness T, and this thickness is greater than the width of the first gap 110.

Similarly, side seal 122 has at least one outer edge 124 received in substantially sealed engagement against the side cover 70 of housing 34, and at least one inner edge 126 received in substantially sealed engagement against the second side 20 of core 12 in the second portion 108 thereof, i.e. against the peripheral edges 28 of the flat tubes 48 and in close proximity to, or in contact with, the outer edges of one of the coolant inlet and outlet manifolds 54, 56. This is best seen in FIG. 3.

The inner and outer edges 126, 124 of side seal 120 are straight edges, meaning that the structure of the side seal 120 is relative simple in shape and less expensive to produce than known seals having a comb-shaped inner edge. For example, the side seal 120 can be simply produced by extrusion, following by cutting the extruded profile into segments of desired length. Alternatively, the side seal 120 can be produced by any other convenient means, such as molding.

The side seal 120 may be formed from a resilient material such as a foamed polymer. Where the side seal 120 is resilient, it will have a thickness sufficient that it will undergo some compression when received between core 12 and housing 34. For example, the side seal 120 may have an uncompressed thickness which is greater than the width of the second gap 112.

Figure 16:
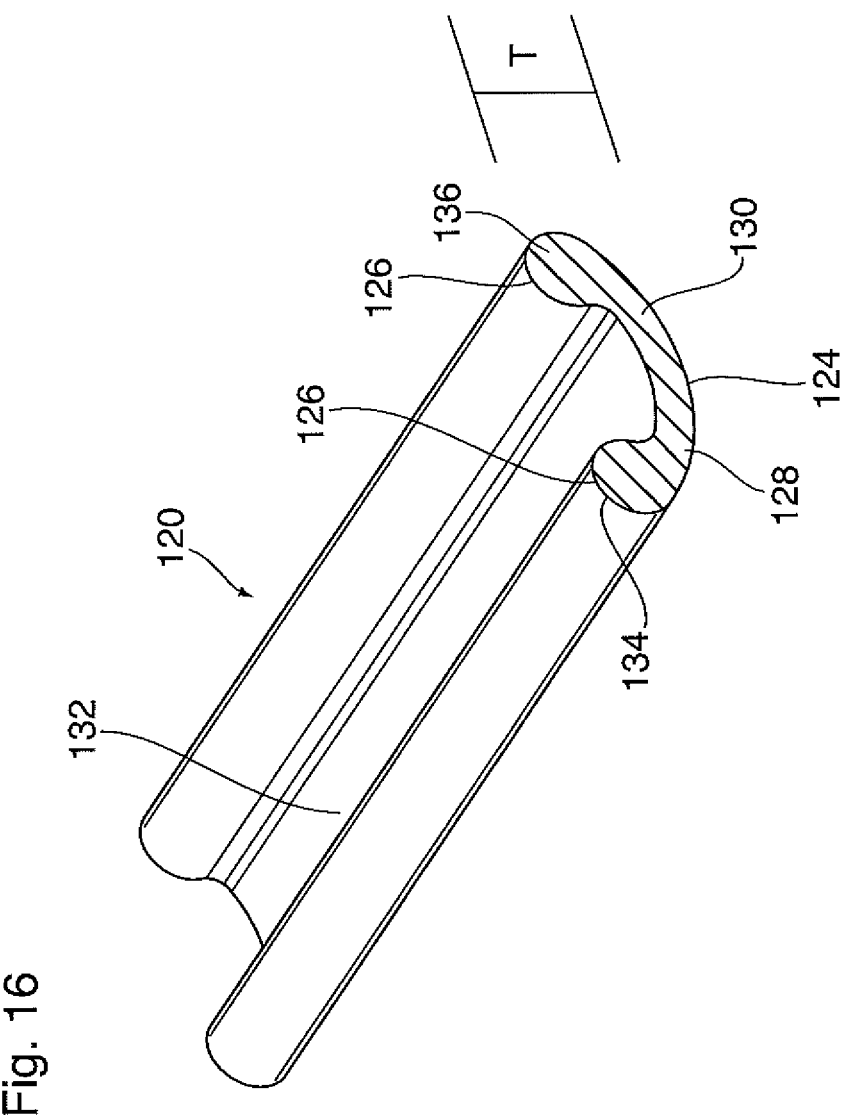
FIG. 16 is an isolated sectional view of a portion of the side seal.
Figure 17:
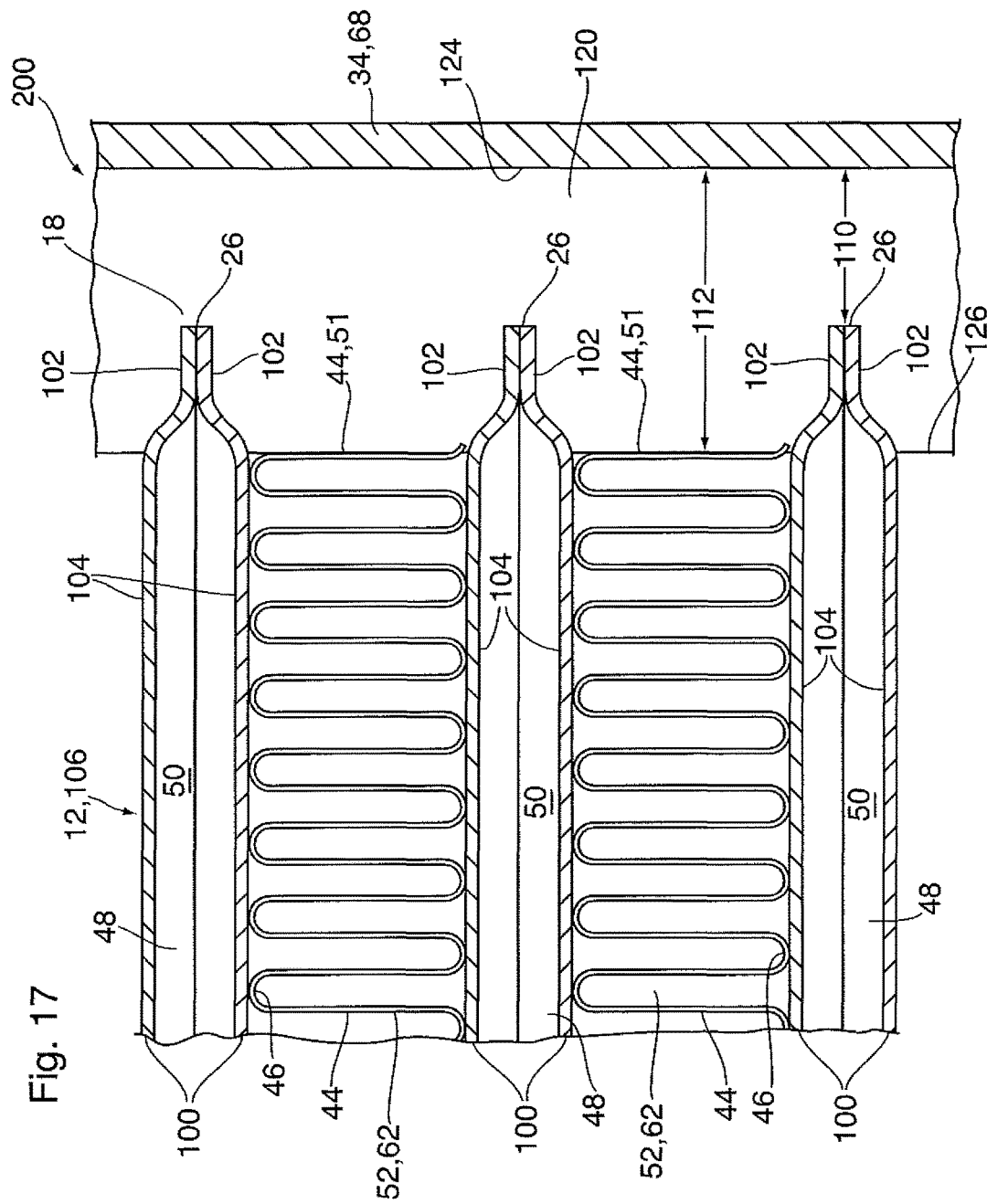
FIG. 17 is a partial transverse cross-section through the first portion of the core of the heat exchanger of FIG. 6.
Figure 18:
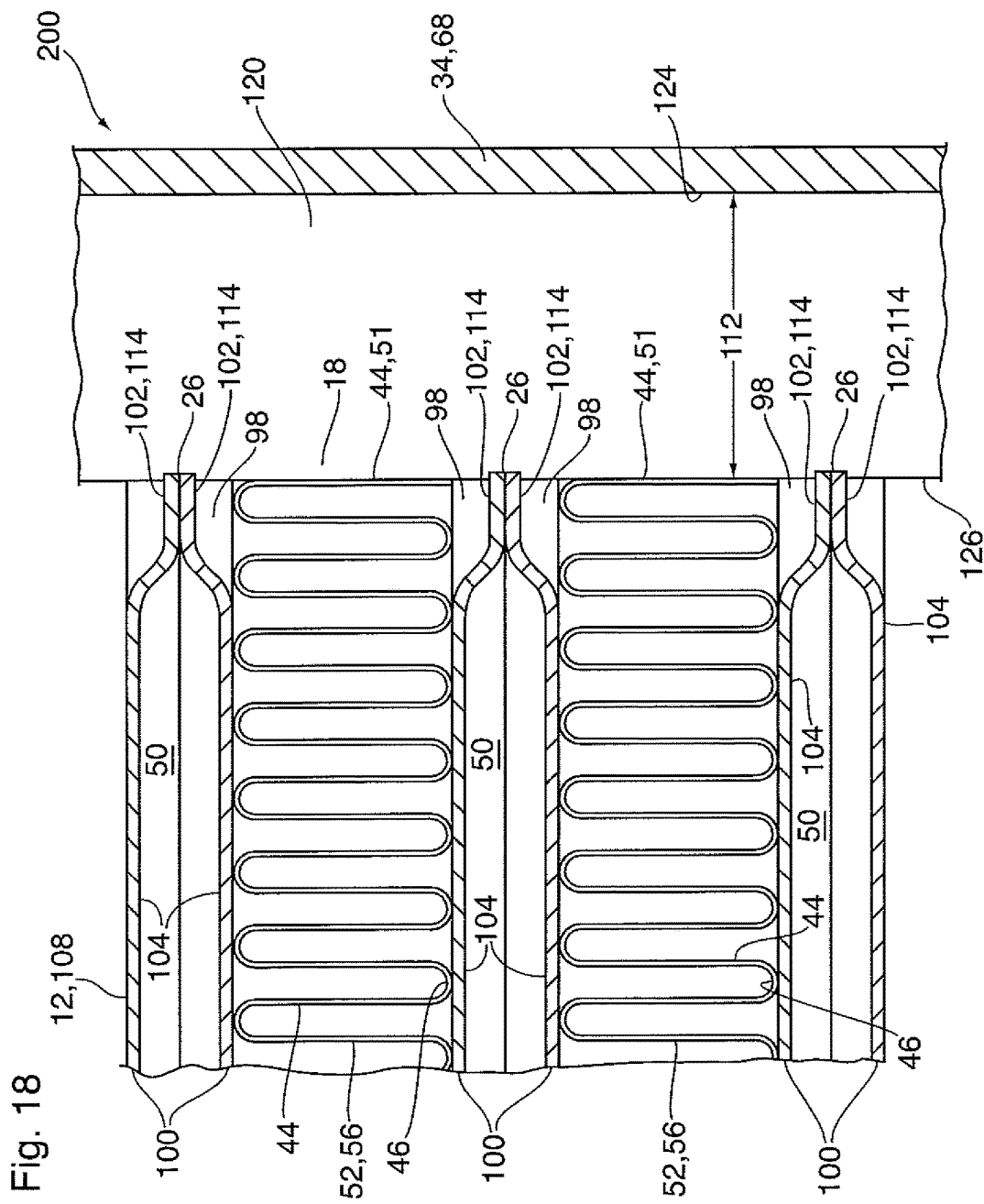
FIG. 18 is a partial transverse cross-section through the second portion of the core of the heat exchanger of FIG. 6.

The cross-sectional shape of the side seal 120 is highly variable. For example, the side seal 120 may have a simple cross-sectional shape such as square, rectangular, circular, oval, etc. In the present embodiment, and as shown in FIG. 16, the side seal 120 has a U-shaped profile, with a pair of legs 128, 130 extending from a curved base section 132 which forms the outer edge 124 of the side seal 120 and engages the side cover 68. The legs 128, 130 have free ends 134, 136 which are located at the inner edge 126 of the side seal 120 and engage the side 18 of core 12.

Although side seal 120 is U-shaped and has two legs 128, 130, it will be appreciated that the side seal 120 may have more than two legs 128, 130, for example side seal 120 may have three or four legs. Furthermore, although the side seal 120 is positioned with the free ends 134, 136 of legs 128, 130 engaging the first side 18 of core 12 and the base section 132 engaging the side cover 68 of housing 34, it will be appreciated that this orientation may be reversed in some embodiments, with the curved base section 132 engaging the first side 18 of core 12 and the free ends 134, 136 of legs 128, 130 engaging the side cover 68 of housing 34.

The provision of side seal 120 with multiple legs 128, 130 provides benefits in that the legs 128, 130 provide multiple points of contact with the core 12, with each free end 134, 136 forming a seal with the first side 18 of core 12. This arrangement provides a labyrinth seal, whereby any gas flowing through a small space between the first side 18 of core 12 and the free end 134, 136 of one of the legs 128, 130 will become reduced in energy in the space between legs 128, 130. The provision of multiple seals 120 also provides a similar benefit, in that it provides multiple points of sealing along the length L of core 12.

In the present embodiments, the legs 128, 130 also help to retain the side seal 120 in position in the side channel 116 formed in the first side 18 of core 12. In this regard, the second portions 108a, 108b of the core 12, and more specifically the peripheral flanges 102 within the second portions 108a, 108b, may be shaped so as to provide a positive interlock with the side seal 120. This helps to retain the side seal 120 in side channel 116 during manufacture and use of heat exchanger 10, and avoids the need for other retaining means such as adhesive.

Figure 13:
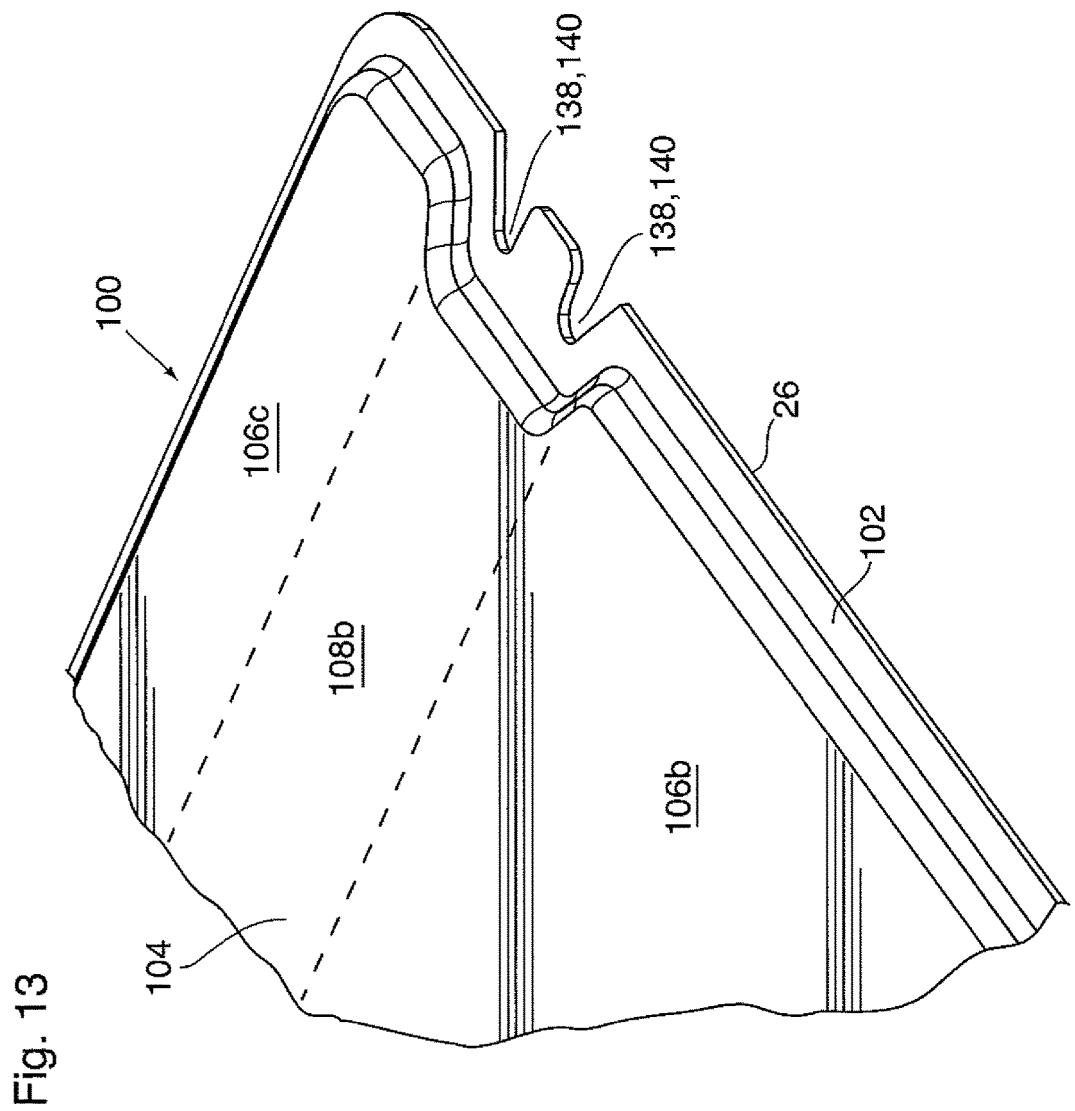
FIG. 13 is a close-up view of a portion of the core plate of FIG. 12.

As best seen in FIGS. 2 and 13, each second portion 108 of core 12 may include interlocking elements 138 which are adapted to engage and retain the free ends 134, 136 of the legs 128, 130 of side seal 120. For example, the free ends 134, 136 may be of increased thickness relative to the remainder of legs 128, 130, and the interlocking elements 138 of core 12 may comprise correspondingly shaped recesses 140 which are shaped to retain the free ends 134, 136 in an interference fit. It will be appreciated that there are numerous possible shapes and configurations which will achieve retention of free ends 134, 136 in the flanges 102.

As mentioned above, there may also be potential for bypass flow between the top 14 of core 12 and the top cover 64 of housing 34, and/or between the bottom 16 of core 12 and the bottom cover 66 of housing 34. In the present embodiment, there is a space between the bottom 16 of core 12 and the bottom cover 66 of housing 34, and therefore heat exchanger 10 includes a bottom seal 142 between the bottom 16 of core 12 and the bottom cover 66 of housing 34. In other embodiments, a similar top seal (not shown) may be provided between the top 14 of core 12 and the top cover 64 of housing 34, either in addition to or instead of the bottom seal 142.

Figure 5C:
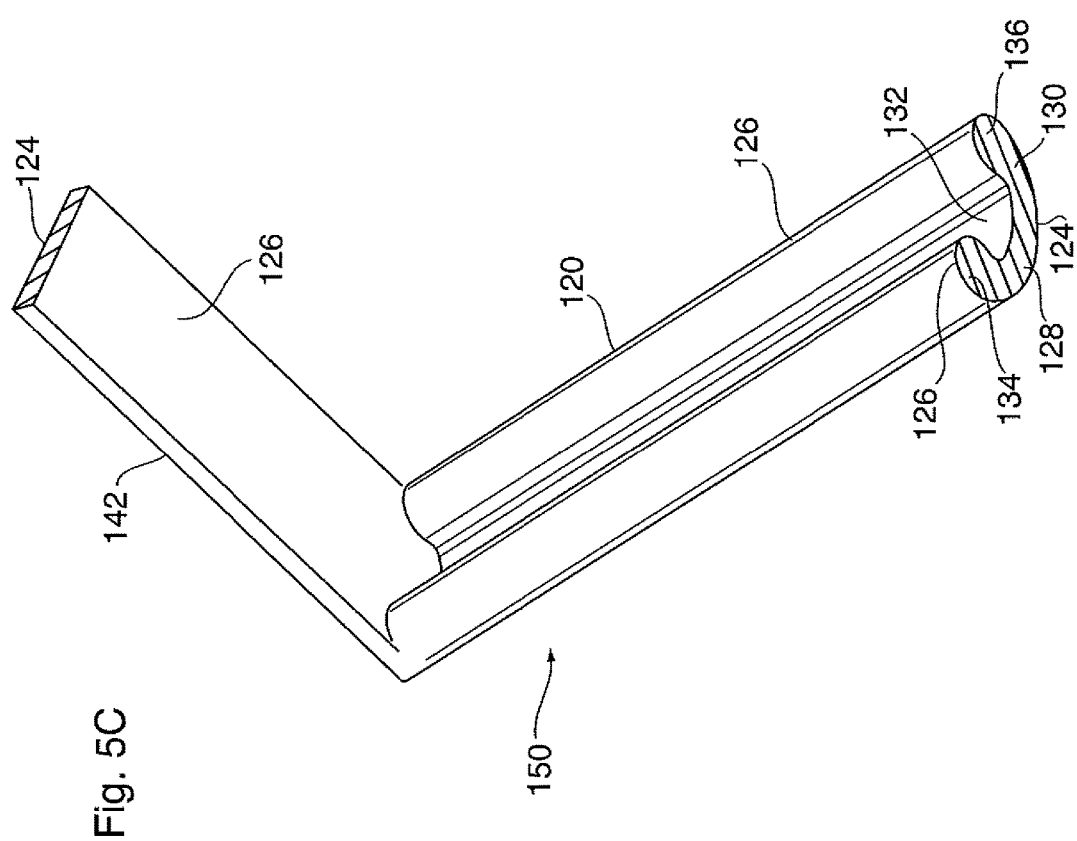
FIG. 5C shows portions of a side seal and a bottom seal joined at a corner.
Figure 6:
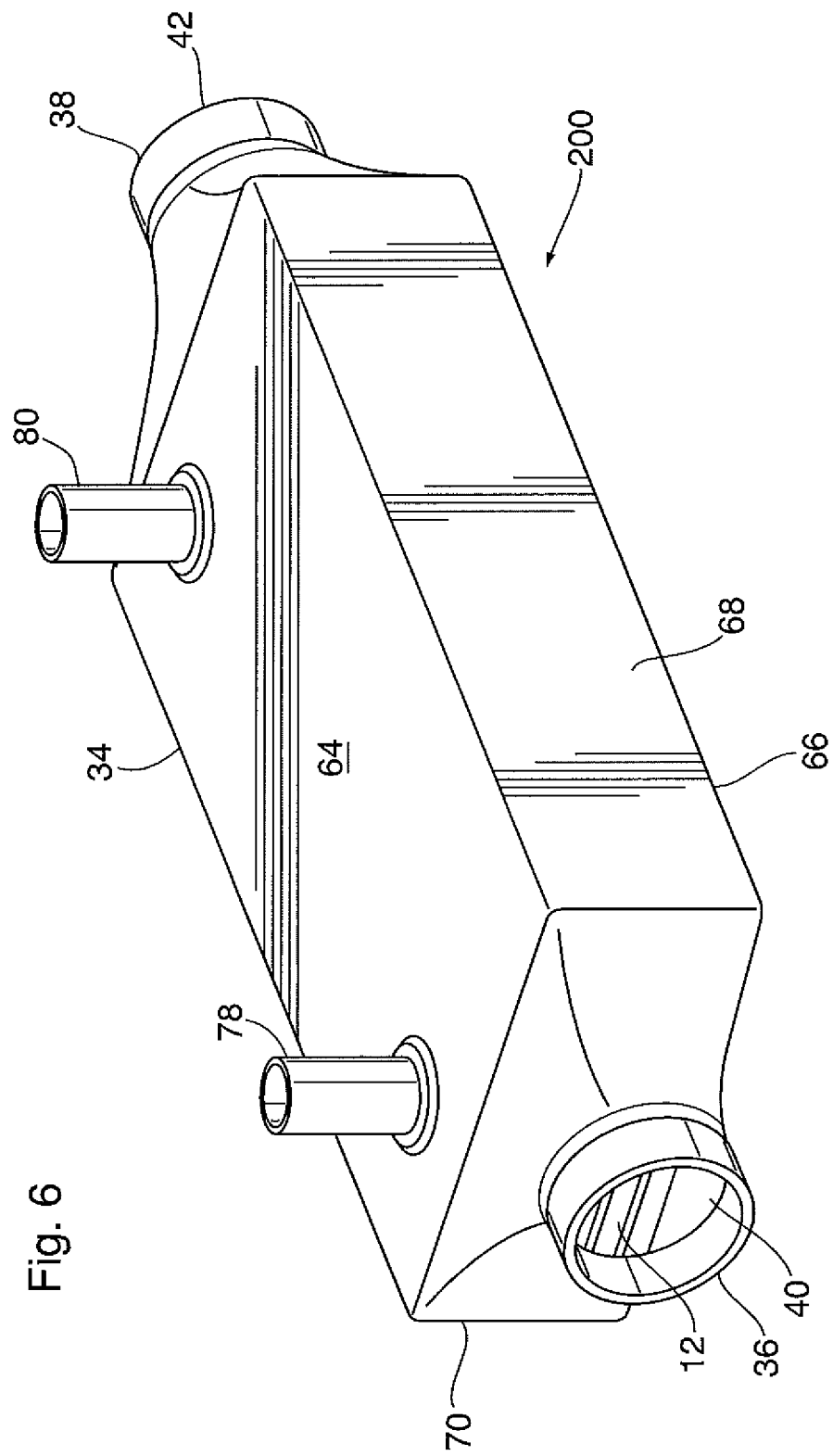
FIG. 6 is a perspective view showing the exterior of a heat exchanger according to a second embodiment disclosed herein.

The following is a description of the features of bottom seal 142, and will refer specifically to FIG. 5C. Since some of the elements of bottom seal 142 are the same as the features of side seal 120, they are identified with like reference numerals.

The bottom seal 142 has an outer edge 124 received in substantially sealed engagement against the bottom cover 66 of housing 34, and at least one inner edge 126 received in substantially sealed engagement against the bottom 16 of core 12, more specifically against the bottom plate 58. The inner and outer edges 126, 124 of bottom seal 142 are straight edges, and therefore bottom seal 142 can be simply produced by extrusion or molding. The bottom seal 142 may be formed from a resilient material such as a foamed polymer, and may have an uncompressed thickness greater than the width of the gap between the bottom 16 of core 12 and the bottom cover 66 of housing 34, such that it will undergo compression during installation. The cross-sectional shape of the bottom seal 142 is highly variable. For example, the bottom seal 142 may have a simple cross-sectional shape such as square, rectangular, circular, oval, U-shaped or any of the other shapes of side seal 120 described above. In the first embodiment, the bottom seal 142 has a flat, rectangular profile.

The top 14 and bottom 16 of core 12 do not include retention features corresponding to side channels 116, 118. However, as described below, heat exchangers as described herein may include features to securely retain the bottom and top seals 142, 144 during manufacture and use of heat exchanger 10.

Although the seals 120, 122, 142 described herein may be individually formed and installed in heat exchanger 10, it is possible to combine two or more of these seals into an integrated seal structure. For example, as shown in FIG. 5C, one or both of side seals 120 and/or 122 may be integrated into a single structure with the top seal 142, referred to herein as a continuous seal member 150 which extends along the top and along one or both sides 18, 20 of core 12. Such an integrated seal structure can be produced by molding, for example.

A heat exchanger 200 according to a second embodiment is now described below. Heat exchanger 200 includes a number of elements in common with heat exchanger 10 described above. These like elements are identified in the drawings and in the following description with like reference numerals, and the description of these elements in connection with heat exchanger 10 applies equally to heat exchanger 200.

Heat exchanger 200 is a charge air cooler for a motor vehicle powered by an engine requiring compressed charge air, such as a turbocharged internal combustion engine or a fuel cell engine. The heat exchanger 200 may be mounted downstream of an air compressor and upstream of an air intake manifold of the engine to cool the hot, compressed charge air before it reaches the engine. However, in some embodiments the heat exchanger 200 may be integrated with the intake manifold, as mentioned above. The coolant circulated through the heat exchanger 200 is a liquid coolant which may be the same as the engine coolant, such as water or a water/glycol mixture.

As shown in FIGS. 6 to 11, heat exchanger 200 comprises a core 12 having a top 14, a bottom 16, a pair of sides 18, 20, an inlet end 22, an outlet end 24, coolant openings 25, 27, coolant manifolds 54, 56, and gas inlet and outlet openings 30, 32 located at the inlet and outlet ends 22, 24. The core 12 has a length L defined between the inlet and outlet ends 22, 24, and a height H defined between the top 14 and bottom 16. It can be seen that the side 18 extends along the length L and height H of the core 12, as does opposite side 20.

Core 12 comprises a stack of flat tubes 48, each of the tubes 48 having a hollow interior defining a coolant flow passage 50, and with peripheral side edges 26, 28 extending along the length L of the core 12. The flat tubes 48 are arranged in a stack with spaces provided between adjacent pairs of the flat tubes 48, these spaces defining a plurality of gas flow passages 52. The gas flow passages 52 extend from the inlet end 22 to the outlet end 24 of core 12, along the length L of core 12. As will be appreciated, each of the gas flow passages 52 has a pair of open ends proximate to the ends 22, 24 of core 12, and a pair of substantially closed sides 51, 53 extending along the length L of the core 12. A width $W_1$ (FIG. 9) of each of the gas flow passages 52 is defined between the substantially closed sides 51, 53 thereof.

Figure 9:
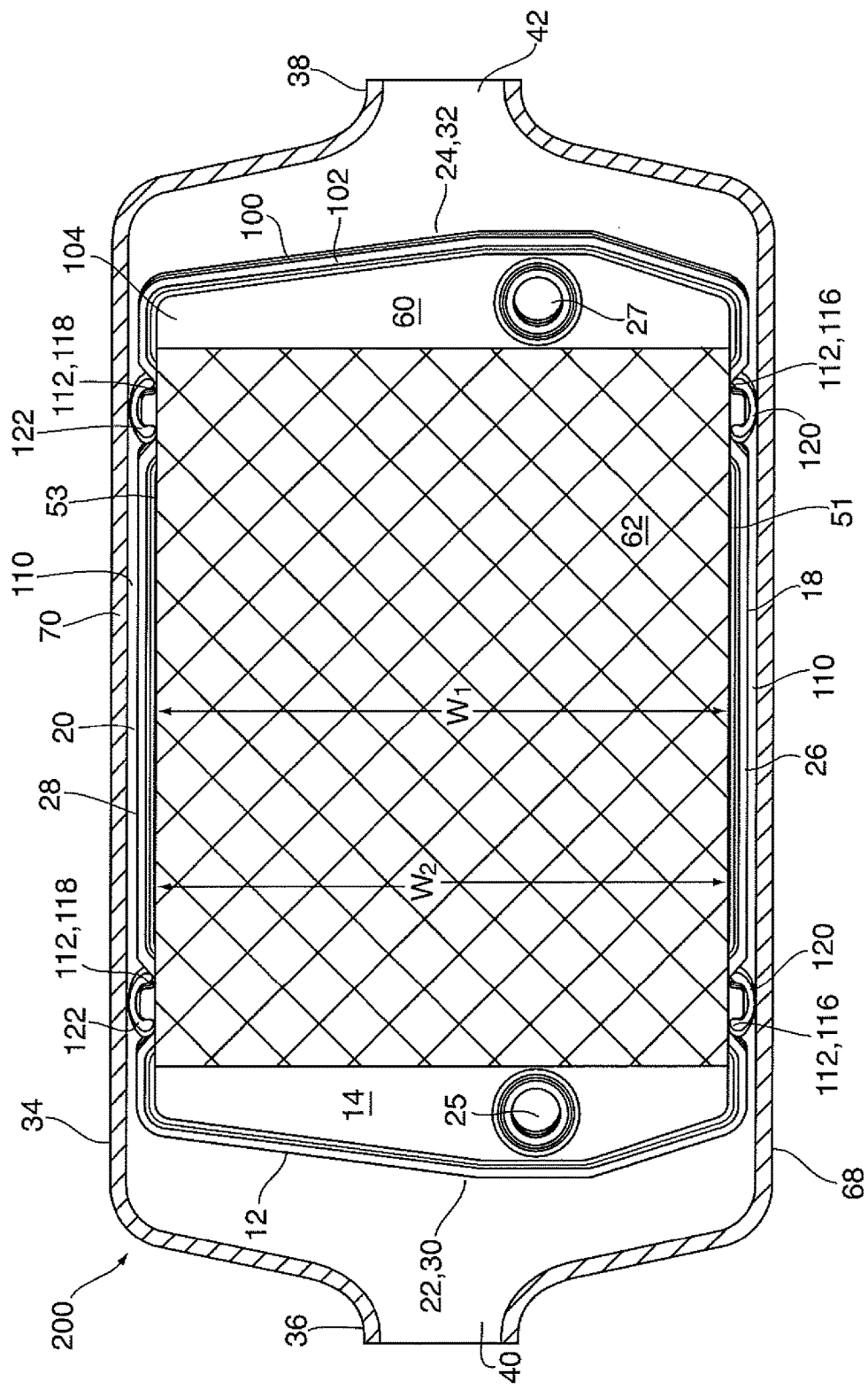
FIG. 9 is a top view similar to FIG. 8, but is sectioned along a plane parallel to the core plates.

The turbulence-enhancing inserts of heat exchanger 200 comprise a plurality of corrugated fins 62. Each of the corrugated fins 62 has a pair of side edges 63, 65 between which a width $W_2$ of the corrugated fin 62 is defined, as shown in FIG. 9. In the second embodiment, width $W_2$ corresponds to or is substantially the same as the width $W_1$ of the gas flow passage 52 in which it is provided.

The corrugated fins 62 are defined by a plurality of parallel sidewalls 44 extending along the length L of core 12, wherein the sidewalls 44 have crests 46 at their tops and bottoms along which they are joined to each other and to adjacent flat tubes 48. Thus, each corrugated fin 62 consists of a row of transversely extending corrugations which are open at the ends 22, 24 of core 12.

Along both sides 63, 65 of the corrugated fin 62, an endmost one of the sidewalls 44 is substantially free of perforations and defines one of the substantially closed sides 51 or 53 of one of the gas flow passages 52. It is advantageous that at least the endmost sidewall 44 is substantially free of perforations so as to minimize the amount of gas which will escape from and bypass the gas flow passages 52 and corrugated fins 62. In embodiments where it is desired to provide the sidewalls 44 with louvers or other types of perforations (not shown), the endmost sidewall 44 may be deformed so as to substantially close the perforations, or the corrugated fin 62 may be provided in multiple sections, including a central section with louvers or other perforations, and two edge sections which are free from perforations.

Figure 7:
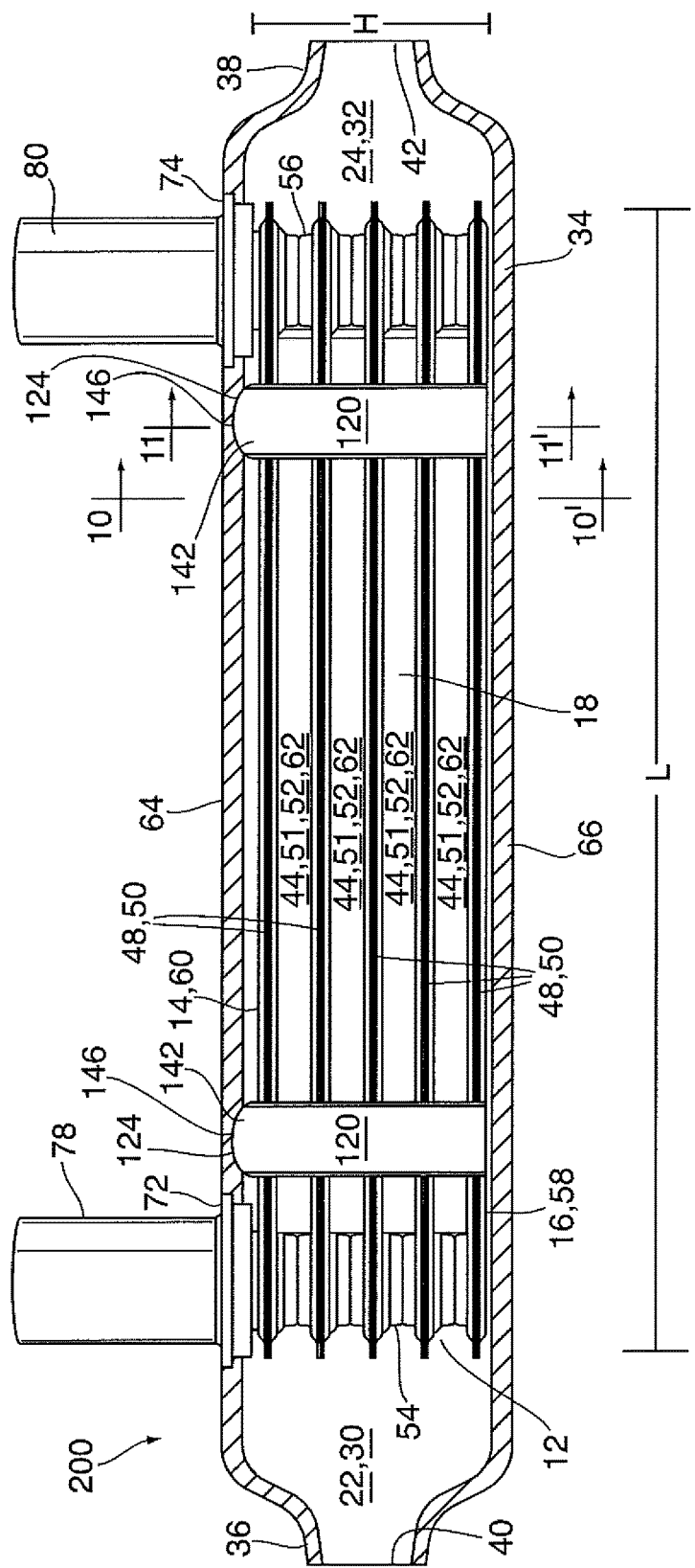
FIG. 7 is a side view of the heat exchanger of FIG. 6, with the housing partly cut away to show the core.
Figure 8:
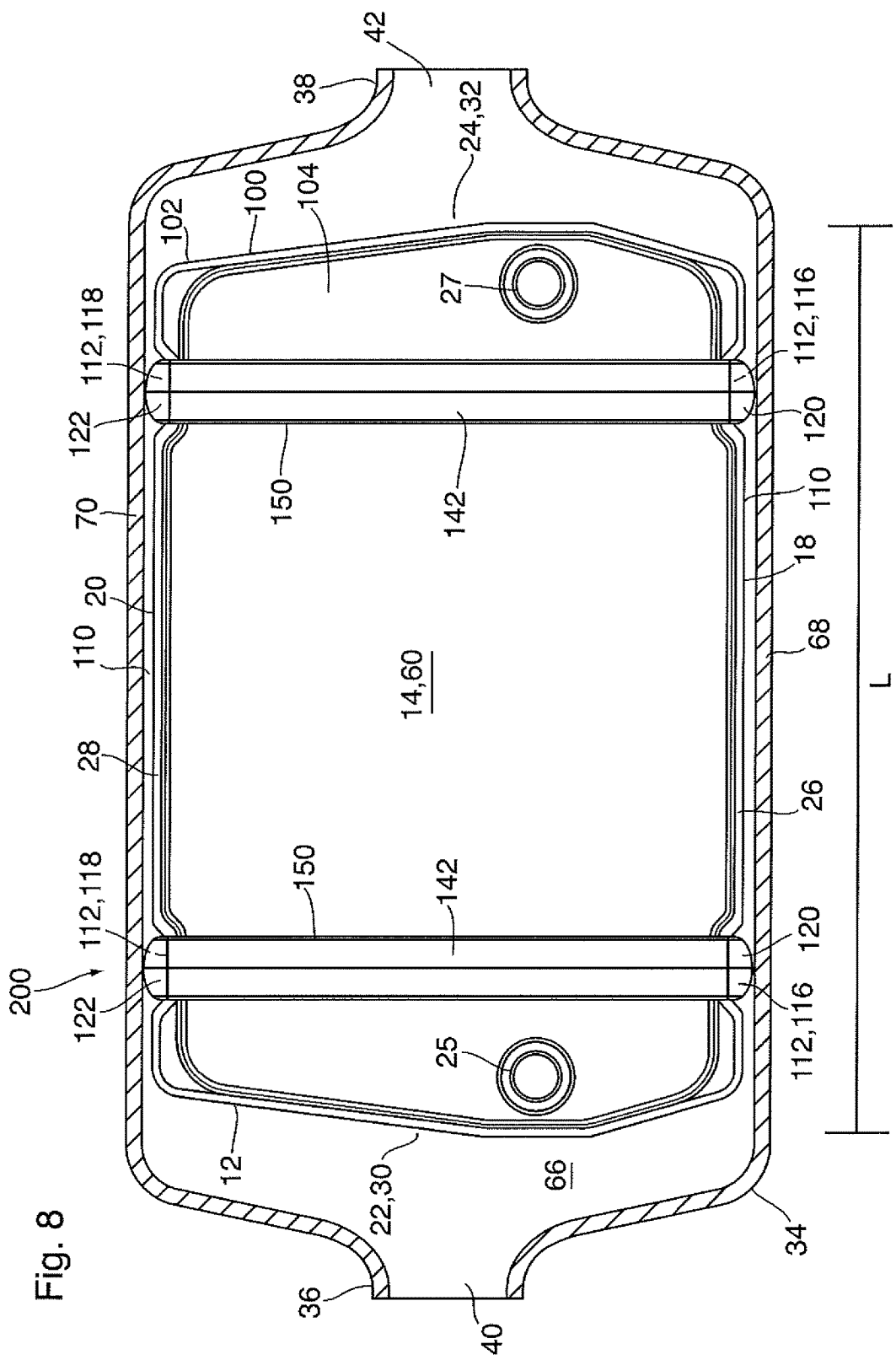
FIG. 8 is a top view of the heat exchanger of FIG. 6, with the housing cut away to show the core.

The coolant flow passages 50 of core 12 are connected by a pair of coolant manifolds 54, 56, as shown in FIG. 7. In the second embodiment, the manifolds 54, 56 are formed by providing apertured, upstanding bosses or bubbles 55, 57 (shown in FIG. 12) in each of the plates 100 making up the tubes 48, with the bosses of adjacent plate pairs being joined to form continuous manifolds 54, 56. The manifolds 54, 56 are in communication with each of the coolant flow passages 50 and extend throughout the height of the core 12, from the top 14 to the bottom 16. The lower ends of manifolds 54, 56 are closed by a bottom plate 58 which defines the bottom 16 of core 12, while the top 14 of core 12 is defined by a top plate 60 in which the coolant openings 25, 27 are defined.

The coolant manifolds 54, 56 are spaced apart along the length L of core 12, and therefore the air and coolant flow may flow in opposite directions (counter-flow arrangement) or in the same direction (co-flow arrangement).

Heat exchanger 200 further comprises a housing 34 surrounding the core 12, the housing having an inlet end portion 36 and an outlet end portion 38. The housing 34 includes at least one side cover 68 or 70 extending along, and spaced from, at least one side 18 or 20 of the core 12. In the second embodiment, the housing 34 is continuous and surrounds the core 12, comprising a pair of said side covers 68, 70 over the sides 18, 20 of core 12, and further comprising a top cover 64 provided over the top 14 of core 12, and a bottom cover 66 provided over the bottom 16 of core 12. Together with the end portions 36, 38, the covers 64, 66, 68, 70 of housing 34 form a substantially continuous enclosure about the core 12, except at inlet and outlet openings for the gas and coolant.

The coolant openings 25, 27 of top plate 60 provide communication between manifolds 54, 56 and coolant openings 72, 74 which are provided in the top cover 64 of housing 34. The housing 34 further comprises a pair of coolant fittings 78, 80 communicating with the respective coolant openings 72, 74, and adapted for connection to coolant conduits (not shown) in a coolant circulation system (not shown). The fittings 78, 80 are sealingly connected to the core 12 through the use of nipples which are brazed to the core and which fit within collars received within the coolant openings 72, 74 of the housing 34.

Both sides 18, 20 of core 12 are spaced from the respective side covers 68, 70 of housing 34, and the top 14 of core 12 is spaced from the top cover 64 of housing 34. In this particular embodiment, the bottom 16 of core 12 may be in direct contact with the bottom cover 66 of housing 34, or the spacing between bottom 16 of core 12 and bottom cover 66 may be so small as to be negligible in terms of bypass flow.

As best seen in FIGS. 8, 9, 15, 17 and 18, the sides 18, 20 of core 12 are spaced from the side covers 68, 70 of housing 34. This spacing is due partly to spacing between the peripheral side edges 26, 28 of tubes 48 (FIGS. 8 and 9) and the side covers 68, 70 of housing 34, and partly due to spacing between the side edges 63, 65 of the corrugated fins 62 (FIG. 9) and the side covers 68, 70 of housing 34. If left open, these spaces will permit excessive bypass flow of the gas, reducing the efficiency of the heat exchanger 200.

In the core construction shown in the drawings, the edges of the tubes 48 are comprised of the peripheral flanges 102 of the core plates 100 from which the tubes 48 are formed. As can be seen in FIG. 9, the width $W_2$ of the corrugated fins 62 is about the same as the width of the raised portions 104 of the core plates 100. Therefore, the inserts 62 do not extend to the edges 26, 28 of the peripheral flanges of tubes 48. For this reason, the sides 18, 20 of core 12 have an irregular comb-like shape. As discussed above, it is difficult to achieve a reliable seal between the sides 18, 20 of core 12 and the housing 34.

Figure 12:
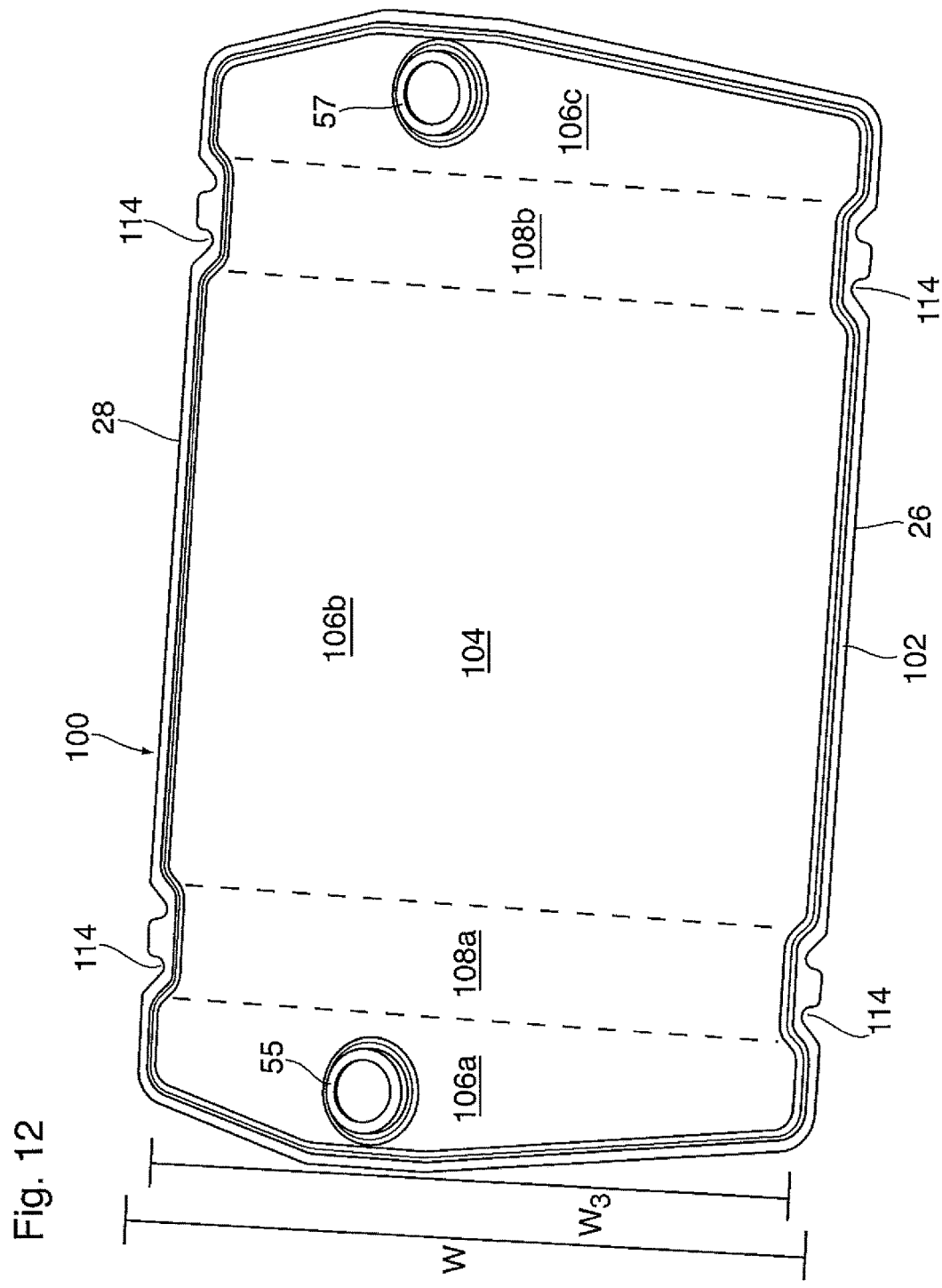
FIG. 12 is an isolated perspective view of a core plate of the heat exchanger of FIG. 6.

The difficulty in forming seals against the sides 18, 20 of core 12 is overcome by altering the shape of the sides 18, 20. In this regard, the core 12 comprises at least one first portion 106 in which the flat tubes 48 have a width W (measured between the peripheral side edges 26 and 28 in said first portion 106, as shown in FIG. 12) which is greater than the width $W_1$ of each of the gas flow passages 52. In these areas of core 12, the corrugated fins 62 are provided only between those portions of tubes 48 through which the coolant circulates, defined by the raised portions 104 of core plates 100, terminating at the edges of the coolant flow passages 50. Therefore, in the first portion 106 of the core 12, the sealed peripheral flanges 102 of the core plates 100 project outwardly beyond the edges 63, 65 of the corrugated fins 62, producing the irregular comb-like shape along both sides 18, 20 of core 12. Three such first portions 106 are included in the present embodiment, and are labelled 106a, 106b and 106c in FIG. 12.

As also shown in FIG. 12, the core 12 also includes at least one second portion 108 in which the flat tubes 48 have a width $W_3$ (measured between the peripheral side edges 26 and 28 in the second portion 108) which is substantially the same as the width $W_1$ of each of the gas flow passages 52. The present embodiment includes two of said second portions, labelled 108a and 108b in FIG. 12. These narrower second portions 108 of the core 12 are formed by extending the peripheral flanges 102 inwardly toward the middles of the flat tubes 48 in these second portions 108. This brings about a local reduction in the width of the raised central portions 104 of core plates 100 and a corresponding reduction in width of the coolant flow passages 50 in second portions 108, while the width $W_1$ of the gas flow passages 52 and the width $W_2$ of the corrugated fins 62 remain constant throughout the first and second portions 106, 108. The reduction in width in the second portions 108 is sufficient such that the width $W_3$ between the peripheral side edges 26, 28 in at least a part of each second portion 108 is substantially the same as the width $W_1$ of the gas flow passages 52 and the width $W_2$ of corrugated fins 62, within acceptable manufacturing tolerances.

It will be seen from the drawings that the second width $W_2$ corresponds to the minimum width between the peripheral side edges 26, 28 within second portions 108, and that the width of the peripheral flange 102 is somewhat variable in the second portions 108. It is important to note that a certain minimum width of the peripheral flange 102 must be maintained within second portions 108 so as to ensure reliable sealing of the coolant flow passages 50, and this requirement accounts for the narrowing of the coolant flow passages 50 in these second portions 108.

Figure 15:
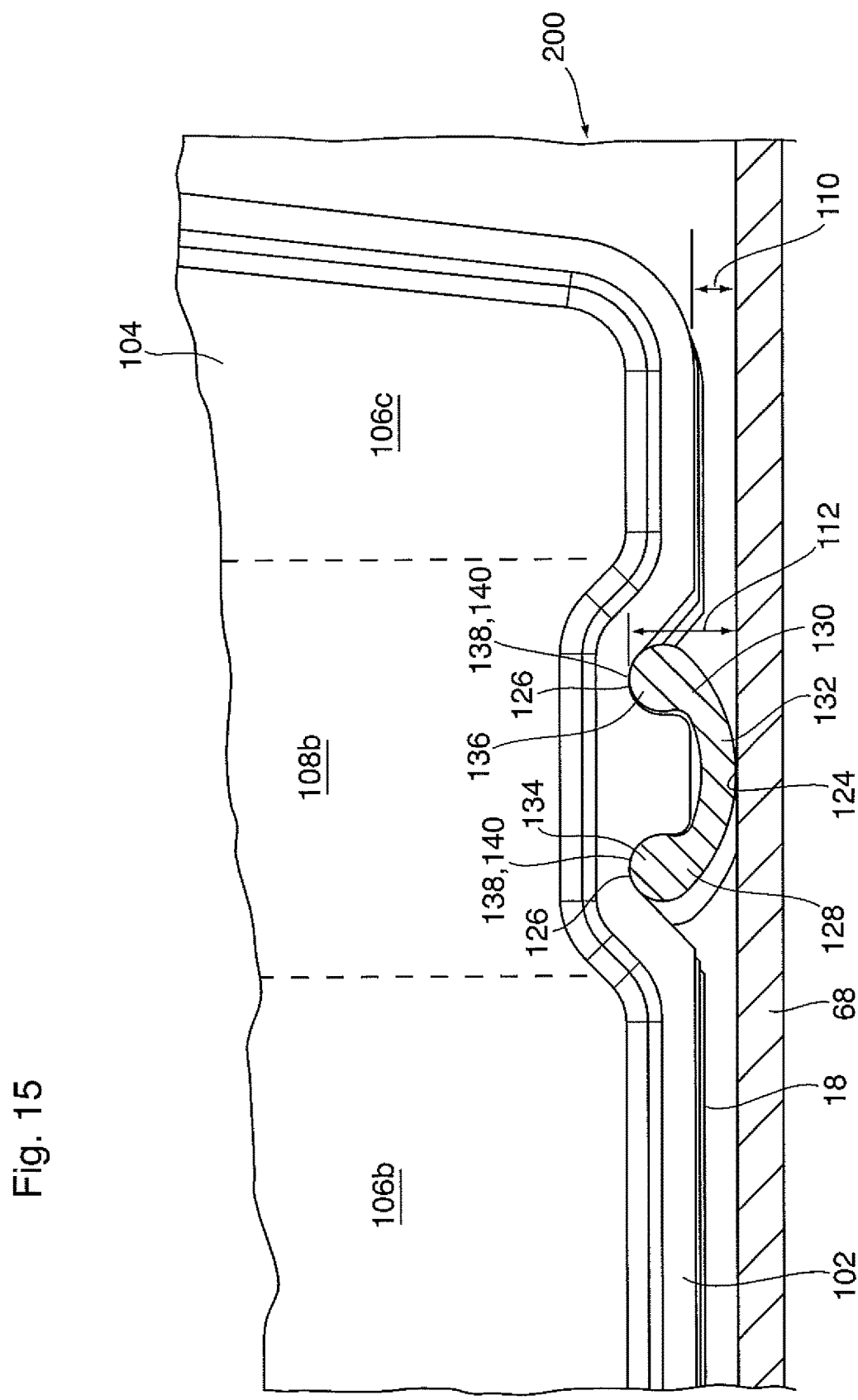
FIG. 15 is a close-up view of an edge of the core, and also showing the side seal and a side cover of the housing.

With the above configuration, as best seen in FIG. 15, there is a first gap 110 between the side cover 68 and the side 18 of the core 12 in the first portions 106 of the core 12, the first gap 110 being less than a second gap 112 between the side cover 68 and the side 18 of core 12 in the second portions 108 of the core 12. In the present embodiment the core 12 is symmetrical, and therefore these same first and second gaps 110, 112 exist between the side 20 of core 12 and the side cover 70 of housing. It will be appreciated that the second gap 112 is the distance between the housing 34 and the second portion 108 of core 12, and more specifically between the housing 34 and those parts of the second portion 108 in which the width $W_3$ between the peripheral side edges 26, 28 is substantially the same as the width $W_1$ of the gas flow passages 52 and the width $W_2$ of the corrugated fins 62, within acceptable manufacturing tolerances.

The locations and relative lengths of the first and second portions 106, 108 of core 12 along the length L of core are variable. For example, in the present embodiment, the second portions 108a, 108b are located close to the ends of core 12, and three first portions 106a, 106b and 106c are provided.

In the present embodiment, the length of the first portions 106 (i.e. the combined lengths of 106a, 106b and 106c) is greater than the individual and combined lengths of the second portions 108a, 108b, wherein the lengths of portions 106, 108 are measured along the length L of core 12.

The maximum amount of the inward extension of the peripheral flange 102 may be approximately equal to the width of the peripheral flange 102. The inward extension of flanges 102 results in edge portions of the corrugated fins 62, proximate to edges 63, 65, extending beyond the raised central areas 104 of core plates 100 and the coolant flow passages 52, due to the reduction in width of central areas 104 and coolant flow passages 52. Thus, the corrugated fins 62 are unsupported in the inwardly extending portion 114, leaving small gaps 98 between the unsupported portion of insert 62 and the adjacent flat tube 48.

The provision of the narrower second portions 108 of core 12 results in the formation of relatively narrow side channels 116, 118 extending throughout substantially the entire height H of core 12. These side channels 116, 118 extend at substantially right angles to the length L of core 12.

Heat exchanger 200 further comprises a pair of side seals 120 and a pair of side seals 122. Each side seal 120, 122 is at least partly received in the second gap 112 between a second portion 108a or 108b of core 12 and the side cover 68 of housing 34, i.e. at least partly received in side channel 116. The side seals 120, 122 extend throughout the height H of core and the heights of side channels 116, 118. As can be seen from FIGS. 9, 15 and 16, the side seals 120, 122 have a thickness T which is greater than the width of the first gap 110.

The following description will focus on the features of each side seal 120, it being appreciated that each side seal 122 is identical in the present embodiment.

It can be seen that side seal 120 has at least one outer edge 124 received in substantially sealed engagement against the side cover 68 of housing 34, and at least one inner edge 126 received in substantially sealed engagement against the side 18 of core 12 in the second portions 108 thereof, i.e. against the peripheral side edges 24 of the flat tubes 48 and the endmost sidewalls 44 of the corrugated fins 62, which define the substantially closed sides 51 or 53 of one of the gas flow passages 52.

The inner and outer edges 126, 124 of side seal 120 are straight edges, meaning that the structure of the side seal 120 is relative simple in shape and less expensive to produce than known seals having a comb-shaped inner edge. For example, the side seal 120 can be simply produced by extrusion or molding, following by cutting the extruded profile into segments of desired length.

The side seal 120 may be formed from a resilient material such as a foamed polymer. Where the side seal 120 is resilient, it will have a thickness sufficient that it will undergo some compression when received between core 12 and housing 34. For example, the side seal 120 may have an uncompressed thickness which is greater than the width of the second gap 112.

The cross-sectional shape of the side seal 120 is highly variable. For example, the side seal 120 may have a simple cross-sectional shape such as square, rectangular, circular, oval, etc. In the present embodiment, the side seal 120 has a U-shaped profile, with a pair of legs 128, 130 extending from a curved base section 132 which forms the outer edge 124 of the side seal 120 and engages the side cover 68. The legs 128, 130 have free ends 134, 136 which are located at the inner edge 126 of the side seal 120 and engage the side 18 of core 12.

Although side seal 120 is U-shaped and has two legs 128, 130, it will be appreciated that the side seal 120 may have more than two legs 128, 130, for example side seal 120 may have three or four legs. Furthermore, although the side seal 120 is positioned with the free ends 134, 136 of legs 128, 130 engaging the core and the base section 132 engaging the side cover 68, it will be appreciated that this orientation may be reversed in some embodiments, with the curved base section 132 engaging the core 12 and the free ends 134, 136 of legs 128, 130 engaging the side cover 68.

The legs 128, 130 also help to retain the side seal 120 in position in the side channel 116 formed in the side 18 of core 12. In this regard, the second portions 108a, 108b of the core 12, and more specifically the peripheral flanges 102 within the second portions 108a, 108b, may be shaped so as to provide a positive interlock with the side seal 120. This helps to retain the side seal 120 in side channel 16 during manufacture and use of heat exchanger 200, and avoids the need for other retaining means such as adhesive.

As best seen in FIGS. 13 to 15, each second portion 108 of core 12 may include interlocking elements 138 which are adapted to engage and retain the free ends 134, 136 of the legs 128, 130 of side seal 120. For example, the free ends 134, 136 may be of increased thickness relative to the remainder of legs 128, 130, and the interlocking elements 138 of core 12 may comprise correspondingly shaped recesses 140 which are shaped to retain the free ends 134, 136 in an interference fit. It will be appreciated that there are numerous possible shapes and configurations which will achieve retention of free ends 134, 136 in the flanges 102.

As mentioned above, there may also be potential for bypass flow between the top 14 of core 12 and the top cover 64 of housing 34, and/or between the bottom 16 of core 12 and the bottom cover 66 of housing 34. In the present embodiment, there is a space between the top 14 of core 12 and the top cover 64 of housing 34, and therefore heat exchanger 200 includes a top seal 142 between the top 14 of core 12 and the top cover 64 of housing 34. In other embodiments, a similar bottom seal (not shown) may be provided between the bottom 16 of core 12 and the bottom cover 66 of housing 34, either in addition to or instead of the top seal 142.

Figure 10:
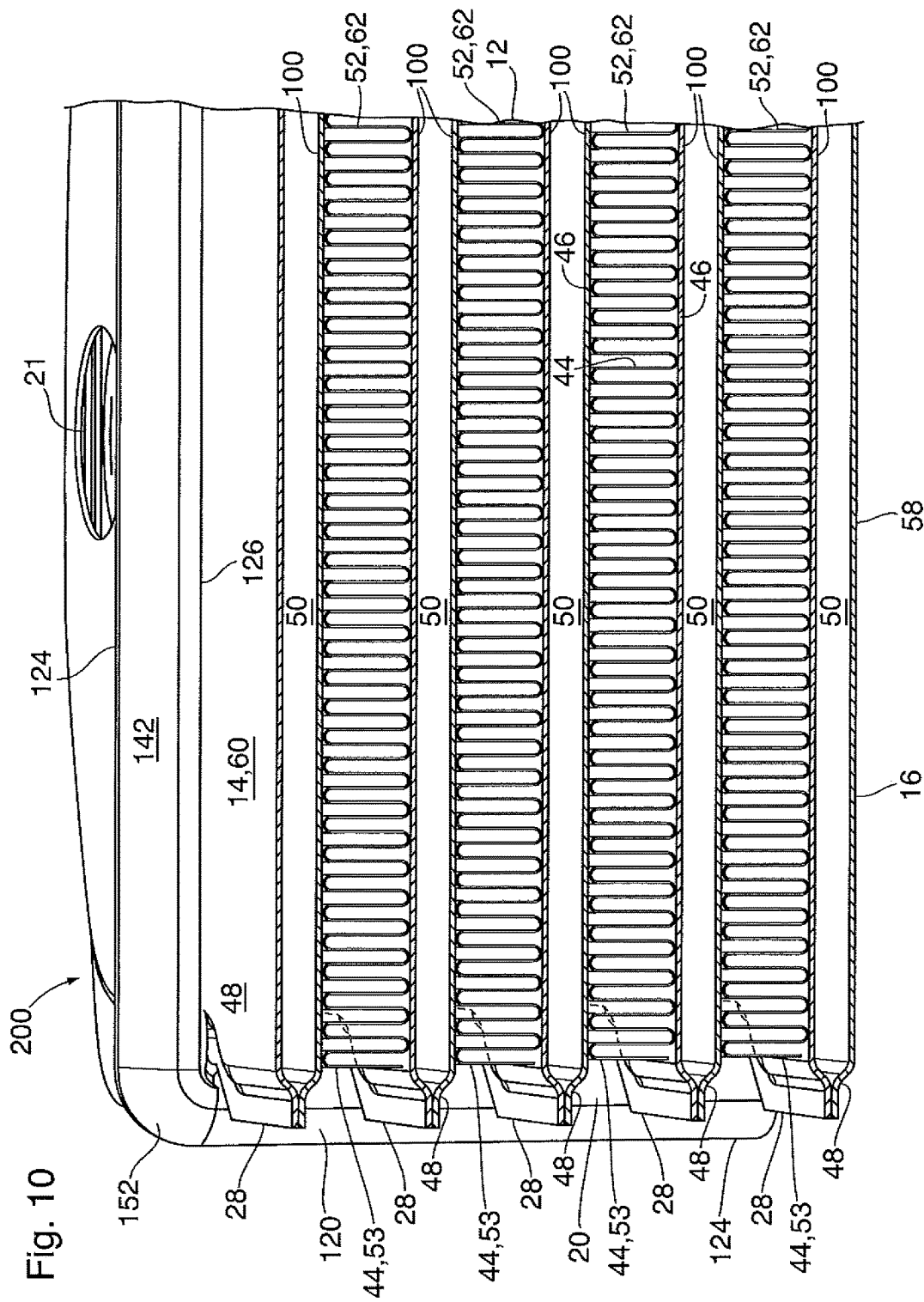
FIG. 10 is an enlarged, transverse cross-section along line 10-10' of FIG. 7.
Figure 11:
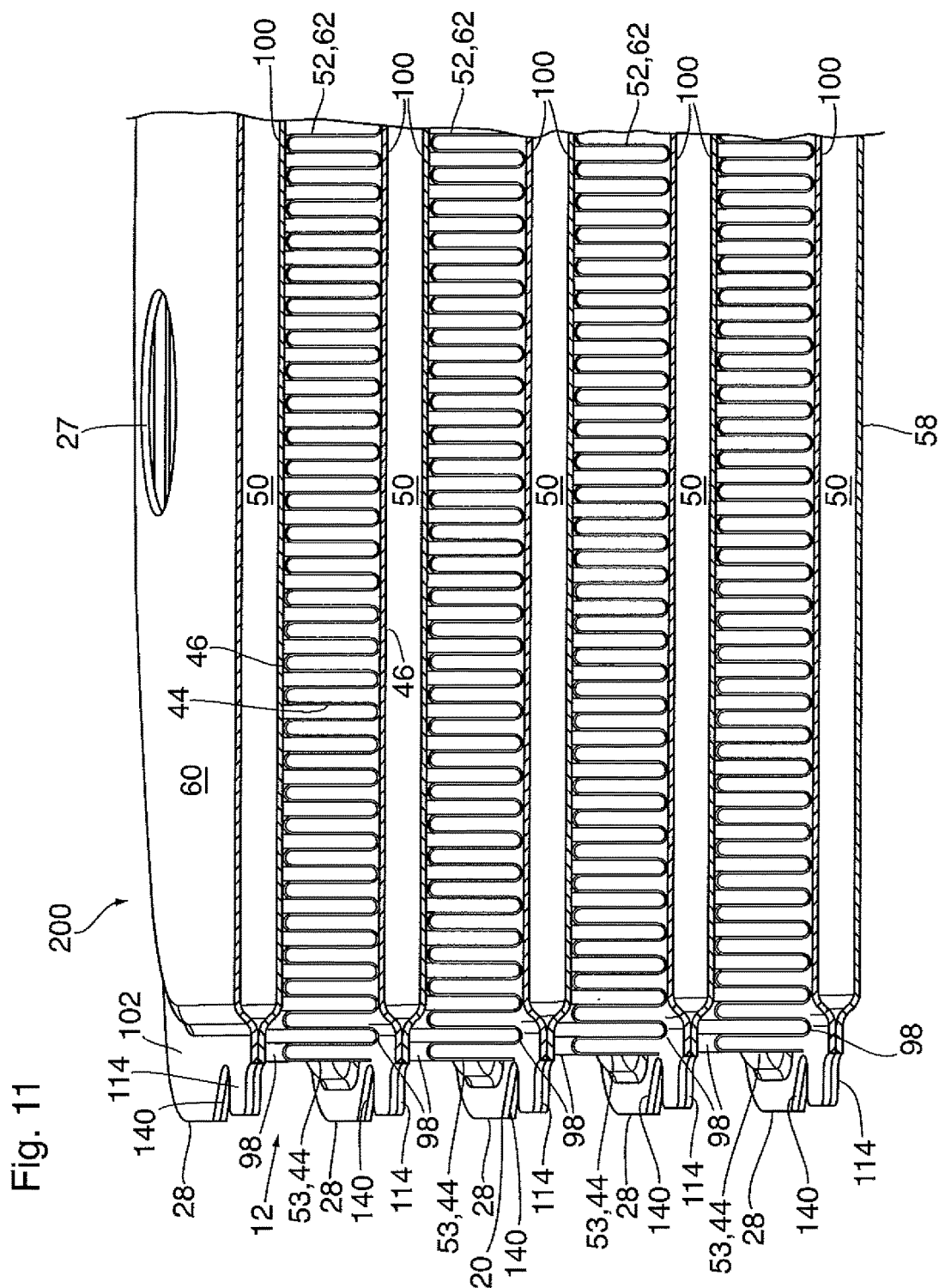
FIG. 11 is an enlarged, transverse cross-section along line 11-11' of FIG. 7, from which the seal member has been removed for clarity.
Figure 19:
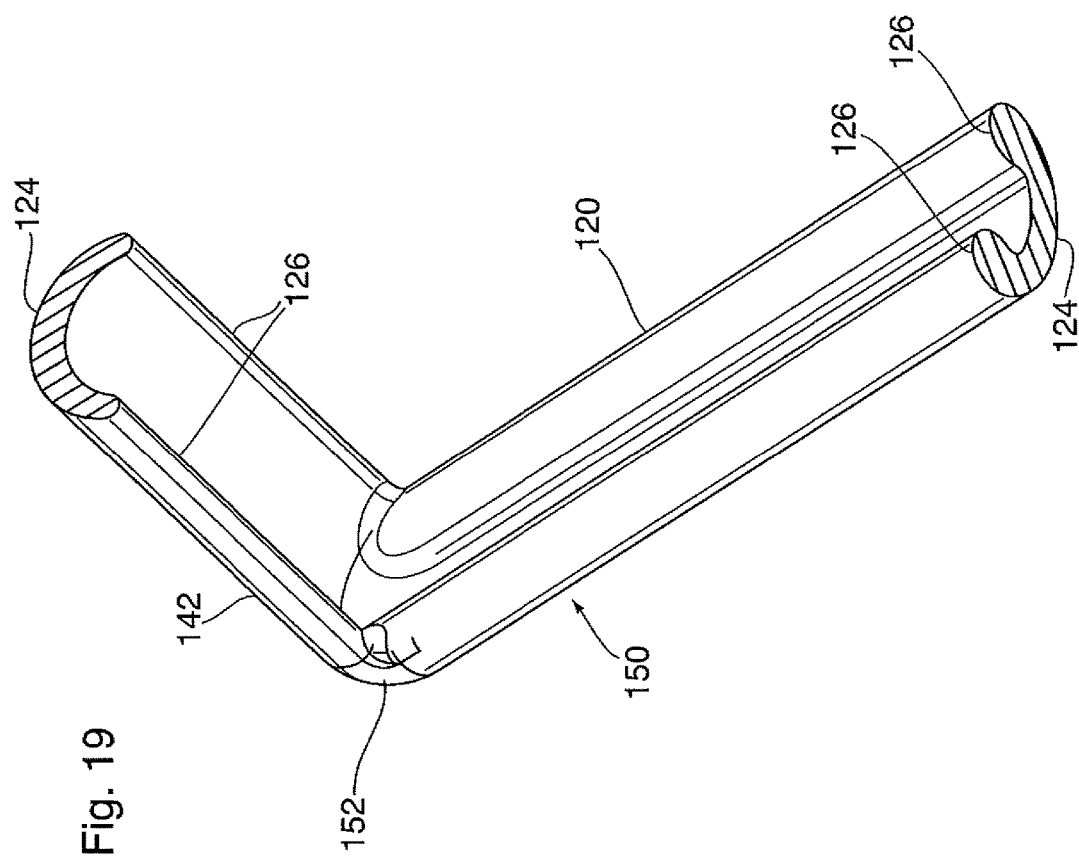
FIG. 19 shows portions of a side seal and a top seal joined at a corner.

The following is a description of the features of top seal 142, and will refer specifically to FIGS. 7, 10 and 19. Since many of the elements of top seal 142 are the same as the features of side seal 120, they are identified with like reference numerals.

As shown in FIGS. 7 and 10, the top seal 142 has an outer edge 124 received in substantially sealed engagement against the top cover 64 of housing 3, and at least one inner edge 126 received in substantially sealed engagement against the top 14 of core 12, more specifically against the top plate 60. The inner and outer edges 126, 124 of top seal 142 are straight edges, and therefore top seal 142 can be simply produced by extrusion. The top seal 142 may be formed from a resilient material such as a foamed polymer, and may have an uncompressed thickness greater than the width of the gap between the top 14 of core 12 and the top cover 64 of housing 34, such that it will undergo compression during installation. The cross-sectional shape of the top seal 142 is highly variable. For example, the top seal 142 may have a simple cross-sectional shape such as square, rectangular, circular, oval, U-shaped or any of the other shapes of side seal 120 described above. In the embodiment of FIG. 19, the top seal 142 has a U-shaped profile which is slightly different from that of side seal 120. However, for reasons which will be explained below, the top seal 142 and bottom seal 144 may have the same profile as that of the side seals 120, 122.

Although the top 14 and bottom 16 of core 12 do not include retention features corresponding to side channels 116, 118, the heat exchanger 200 may include features to securely retain the top and bottom seals 142, 144 during manufacture and use of heat exchanger.

For example as shown in FIG. 10, top seals 142 may be partly embedded in grooves 146 in the top cover 64 of housing 34. Similarly, where a bottom seal is employed, it may be embedded in a similar groove (not shown) in the bottom cover 66 of housing 34. The retention of the top seal 142 and/or bottom seal may be enhanced by the use of adhesive between the core 12 and/or housing 34.

Instead of, or in addition to, providing retention grooves 146 or 148 in the housing 34, it may be possible to incorporate retention features (not shown) in the top plate 58 and/or bottom plate 60 to retain the inner edge 126 of the top seal 142 or bottom seal 144. For example, such a retention feature may comprise one or more raised ridges formed in the top plate 58 or bottom plate 60 of the heat exchanger core 12.

Although the seals 120, 122, 142 described herein may be individually formed and installed in heat exchanger 200, it is possible to combine two or more of these seals into an integrated seal structure. For example, as shown in FIG. 19, one or both of side seals 120 and/or 122 may be integrated into a single structure with the top seal 142, referred to herein as a continuous seal member 150 which extends along the top and along one or both sides 18, 20 of core 12.

Figures 20, 21:
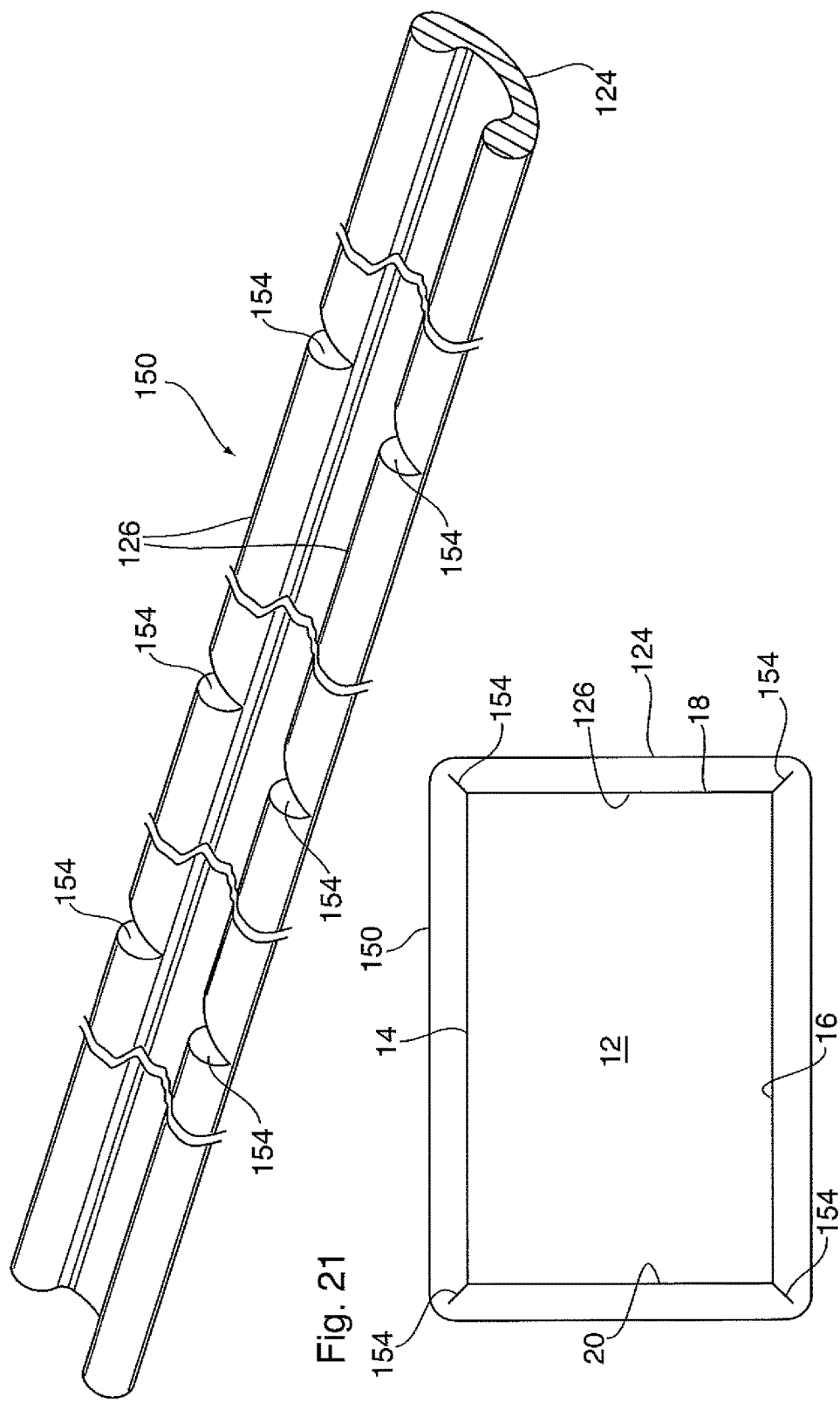
FIG. 20 shows a continuous seal member in a straight configuration.
FIG. 21 shows the continuous seal member of FIG. 20 wrapped around a heat exchanger core.
Figure 22:
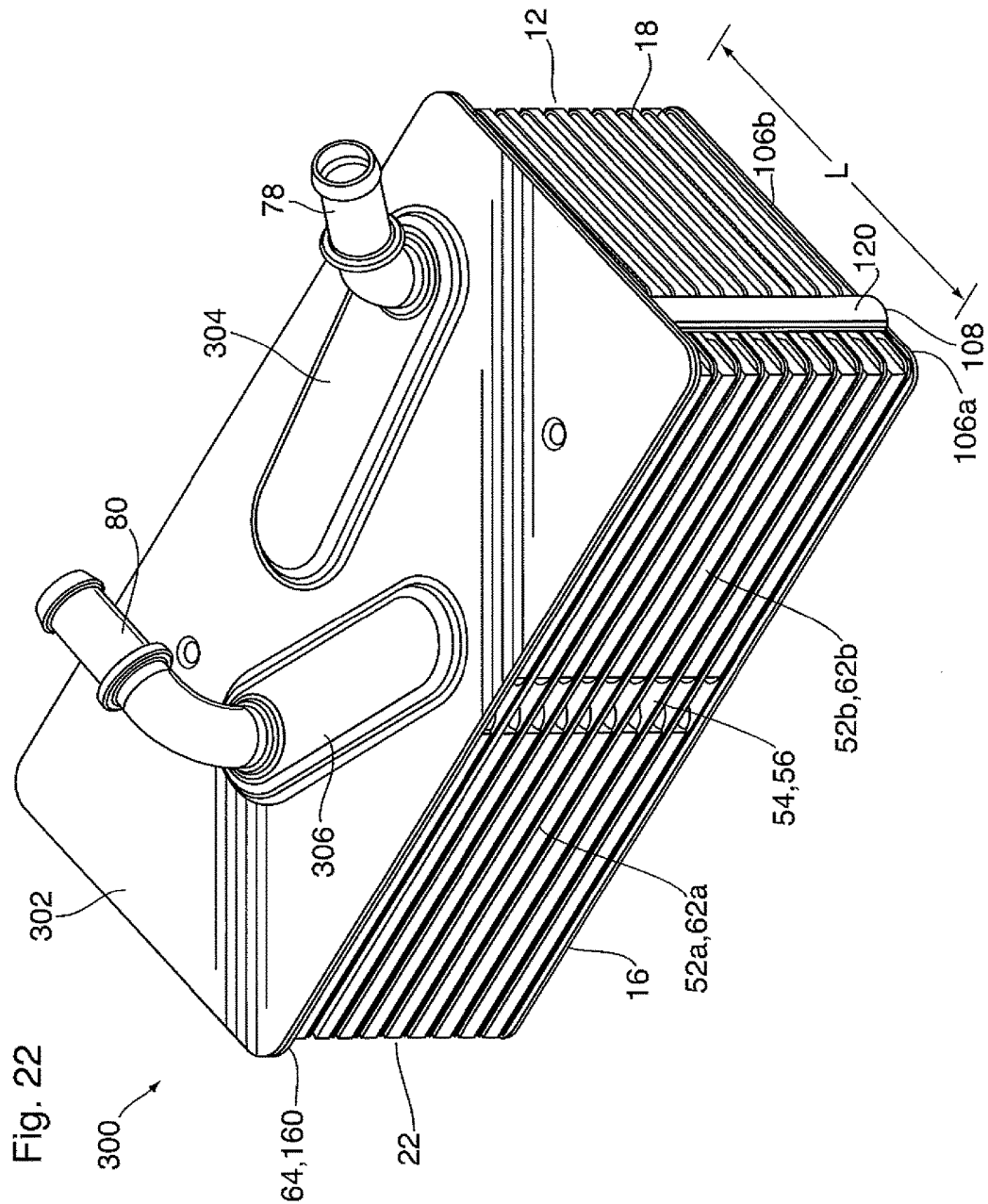
FIG. 22 is a perspective view of the core of a heat exchanger according to a third embodiment.
Figure 23:
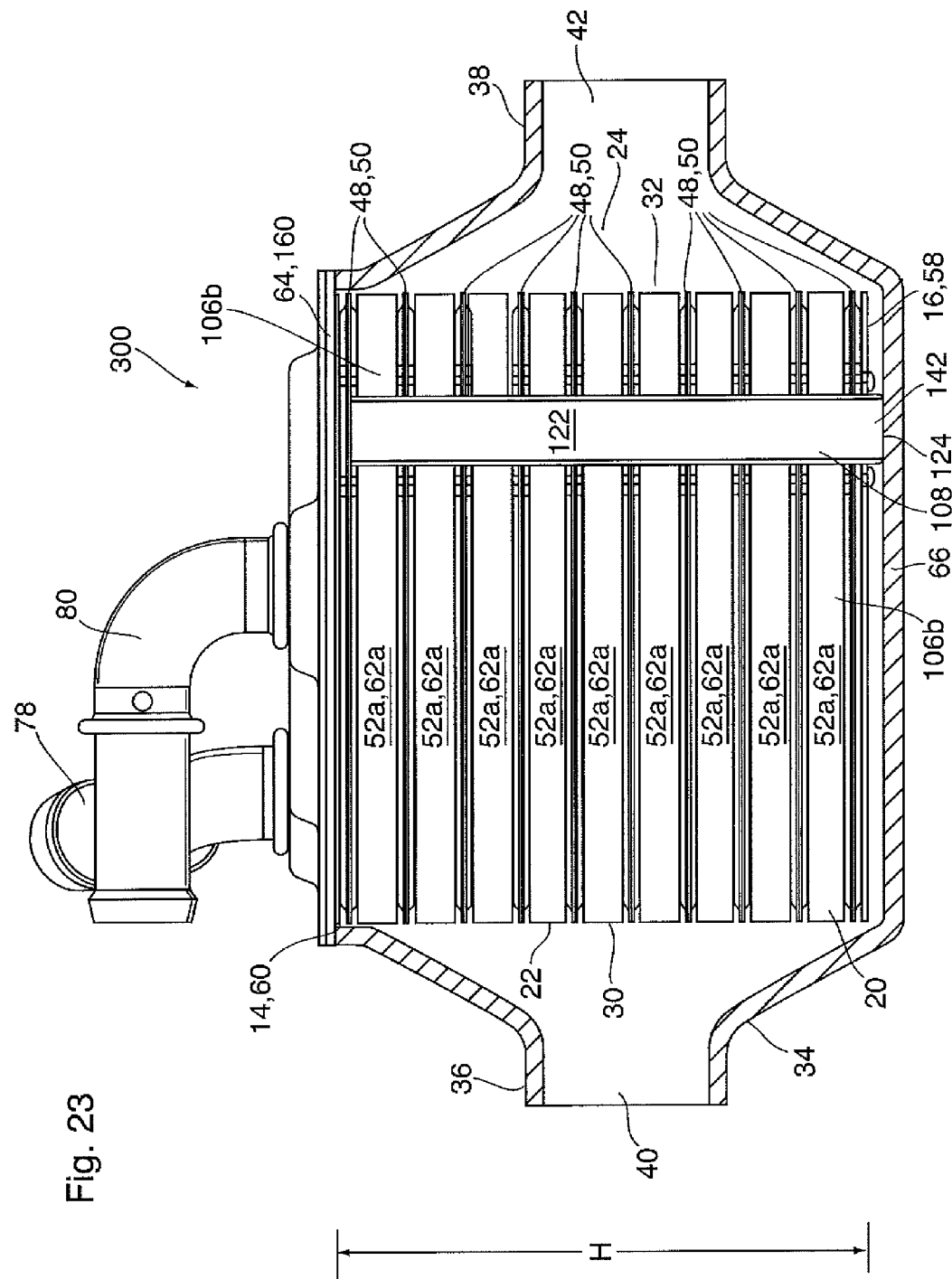
FIG. 23 is a side view of the heat exchanger of FIG. 23, with a portion of the housing cut away.

The continuous seal member 150 comprises a single, elongate, resilient extrusion and can be wrapped around the core 12 prior to installation of the core 12 in the housing 34. The continuous seal member 150 includes wrappable corner portions 152 (FIGS. 10 and 19) which wrap around the corners of the core 12 at which the sides 18, 20 of core intersect the top 14. The wrappable corner portions 152 can be pre-formed or may be provided with features which make them easy to wrap around core 12. For example, as shown in FIGS. 20 and 21, the wrappable corner portions 152 may comprise V-shaped notches 154 extending partly through the thickness of seal member 150, the notches 154 being open at the inner edge 126 of seal member 150. Where the extrusion comprises two or more legs 128, 130, the notches 154 are formed in both legs.

The continuous seal member 150 of FIG. 20 is adapted to wrap completely around core 12 as shown in FIG. 21, thereby providing seals along both sides 18, 20 and along the top 14 and bottom 16. This seal member 150 includes three pairs of notches 154, to provide corner portions 152 at three of the four corners of core 12. The ends of the continuous seal member 150 meet at the fourth corner of core 12 and may be held together by glue. For this purpose, the ends of the continuous seal member may be mitered, as shown at 156 in FIG. 21.

The provision of the seals in the form of a continuous seal member 150 simplifies installation, and may also provide improved retention of the seals, and improved sealing at the corners of the core 12.

The heat exchanger 200 described above includes two separate sets of seals, each set of seals comprising a pair of side seals 120, 122 and a top seals 142, with the two sets of seals being located at opposite ends 22, 24 of core 12. However, it will be appreciated that heat exchangers according to the invention can include one or more sets of seals located at various positions along the length of core 12, and that each set of seals can include a side seal 120, a side seal 122, a top seal 142 and/or a bottom seal, and whether or not such seals are separately formed or are integrated into a continuous seal member 150. Where a single set of seals is provided, it can be located at any position along the length L of core 12, including positions which are proximate to the ends 22, 24 or the middle of core 12. The core plates 100 will be configured as required, according to the number and locations of seals required.

A heat exchanger 300 according to a third embodiment is now described below. Heat exchanger 300 includes a number of elements in common with heat exchangers 10 and 200 described above. These like elements are identified in the drawings and the following description with like reference numerals, and the description of these elements in connection with heat exchangers 10 and/or 200 applies equally to heat exchanger 300.

Heat exchanger 300 is similar in overall shape to heat exchanger 200 described above, the primary difference being that the inlet and outlet manifolds 54, 56 of heat exchanger 300 are centrally located within the core 12 and aligned along the length L thereof, dividing each gas flow passage 52 into two segments 52a, 52b and also dividing each corrugated fin 62 into two segments 62a, 62b.

As with heat exchanger 200 described above, heat exchanger 300 includes a housing 34 having a top cover 64 which is integrated with the core 12. The top cover 64 comprises a relatively thick, flat flange plate 160 which may be comprised of aluminum and has its bottom face brazed to the top plate 60 of the core 12. The flange plate 160 is provided with a pair of coolant openings 72, 74 which communicate with the coolant manifolds 54, 56, and the top face of the flange plate 160 is provided with a pair of coolant fittings 78, 80. The edges of the flange plate 160 will be sealingly connected to the remainder of housing 34 by any convenient means, such as mechanical connection, brazing or welding.

In the present embodiment, the coolant fittings 78, 80 are offset from the center of the core 12, and therefore they are attached to the flange plate 160 through an intermediate plate 302 having offset channels 304, 306 providing communication between the coolant manifolds 54, 56 and the respective coolant fittings 78, 80.

Figure 24:
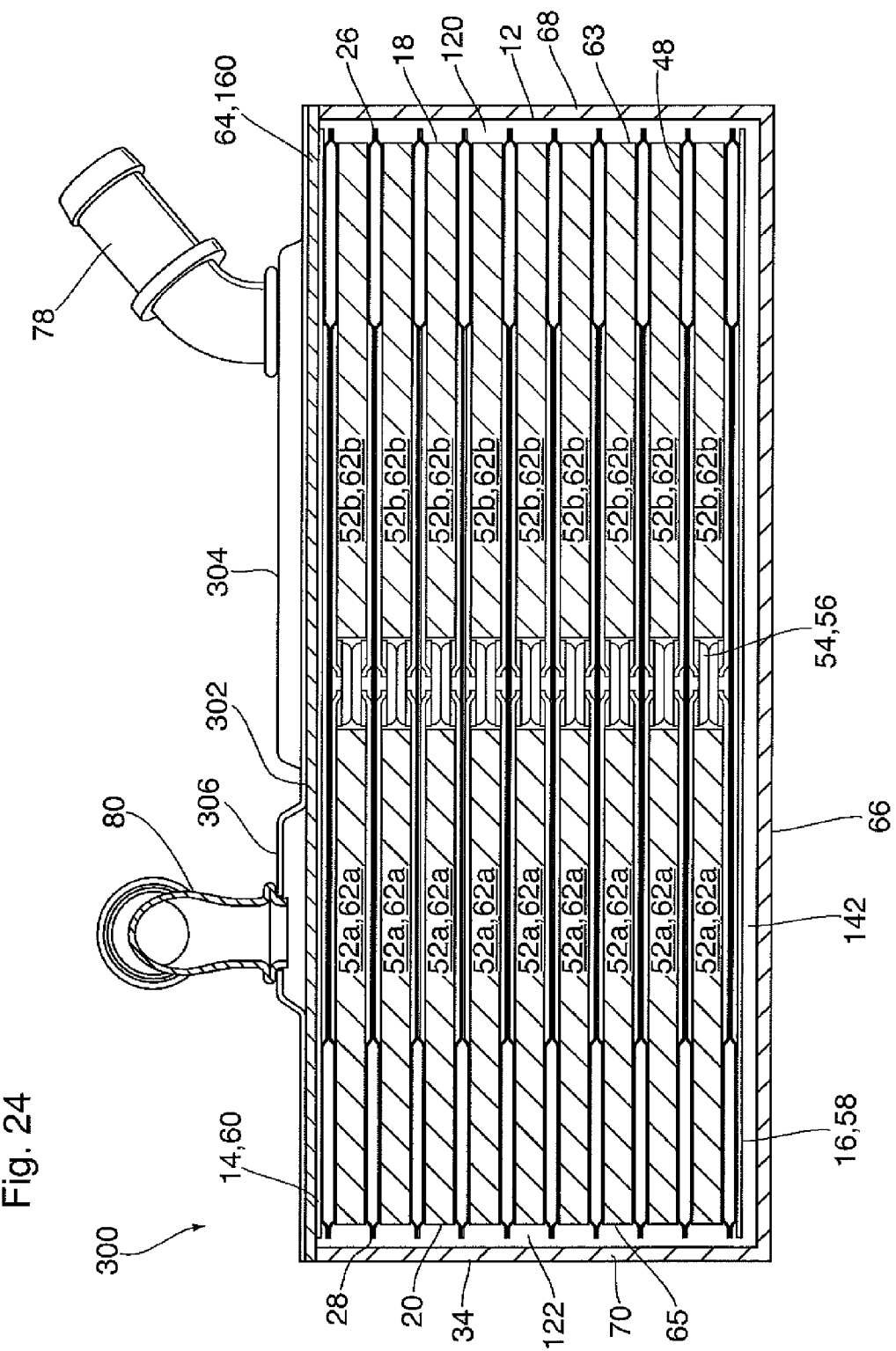
FIG. 24 is a front view of the heat exchanger of FIG. 23, with a portion of the housing cut away.
Figure 25:
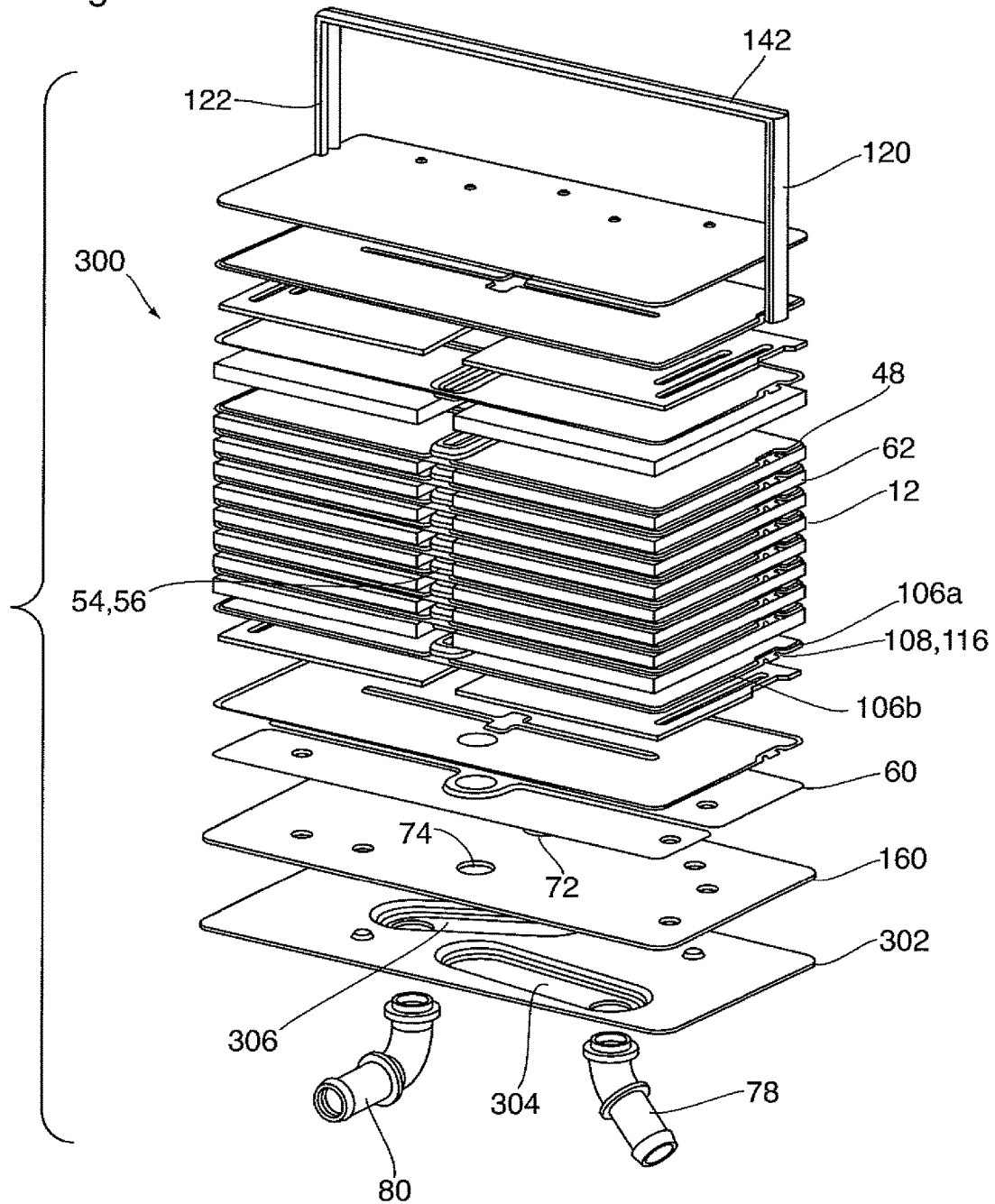
FIG. 25 is an exploded view of the core of the heat exchanger of FIG. 23.

As best seen in FIG. 24, the sides 18, 20 of core 12 are spaced from the side covers 68, 70 of housing 34. This spacing is due partly to spacing between the peripheral side edges 26, 28 of tubes 48 and the side covers 68, 70 of housing 34, and partly due to spacing between the side edges 63, 65 of the corrugated fins 62 and the side covers 68, 70 of housing 34. This results in an irregular comb-like shape along both sides 18, 20 of core 12.

The core 12 of heat exchanger 300 differs from heat exchanger 10 and 200 in that it includes a pair of first portions 106a, 106b separated by one second portion 108, wherein the first and second portions 106, 108 are defined as in the first and second embodiments described above. This results in the formation of one side channel 116, 118 on each side 18, 20 of core 12, channels 116, 118 extending throughout substantially the entire height H of core 12.

Heat exchanger 300 further comprises one side seal 120, one side seal 122 and one bottom seal 142, having substantially the same configuration as the seals 120, 122 and 142 of heat exchanger 10.

Each side seal 120, 122 is at least partly received in the second gap 112 between a second portion 108a or 108b of core 12 and the side cover 68 or 70 of housing 34, i.e. at least partly received in side channel 116 or 118. The side seals 120, 122 extend throughout the height H of core 12 and the heights of side channels 116, 118.

The bottom seal 142 has a rectangular profile, and is received in substantially sealed engagement against the bottom cover 66 of housing 34, and against the bottom plate 58 of core 12.

Although the invention has been described in connection with certain embodiments, it is not limited thereto. Rather, the invention includes all embodiments which may fall within the scope of the following claims.

What is claimed is:

1. A gas/liquid heat exchanger comprising:
(a) a core having a length, a height, and a pair of opposed sides extending throughout the length and the height of the core,
wherein the core comprises a plurality of flat tubes arranged in a stack with a space provided between each adjacent pair of said flat tubes, each of the flat tubes having a hollow interior defining a liquid flow passage, and each of the spaces defining a gas flow passage;
wherein each of the flat tubes has a pair of peripheral edges extending along the length of the core, the peripheral edges of the flat tubes partly defining the sides of the core;

wherein each of the gas flow passages has a pair of open ends and a pair of opposed sides, wherein a width of each said gas flow passage is defined between the opposed sides, the opposed sides of the gas flow passages partly defining the sides of the core;

wherein the core comprises a first portion in which the flat tubes have a first width which is greater than the width of each of the gas flow passages, wherein the first width is defined between the peripheral edges of the flat tubes in said first portion;

wherein the core has a second portion in which the flat tubes have a second width which is substantially the same as the width of each of the gas flow passages, wherein the second width is defined between the peripheral edges of the flat tubes in said second portion;

(b) a housing surrounding the core, wherein the housing comprises an inlet end portion with a gas inlet opening and an outlet end portion with a gas outlet opening, wherein the gas inlet and outlet openings communicate with the open ends of the gas flow passages of the core;

wherein the housing includes at least one side cover extending along, and spaced from, the at least one side of the core, wherein a first gap between the side cover and the side of the core in the first portion of the core is less than a second gap between the side cover and the side of the core in the second portion of the core; and (c) a side seal at least partly received in the gap between the side cover of the housing and the second portion of the core;

wherein the side seal extends throughout the height of the core and has a thickness which is greater than the first gap;

wherein the seal includes two legs having ends which engage the core in the second portion thereof;

wherein the seal is U-shaped;

wherein the second portion of the core includes interlocking elements which engage and retain the ends of the legs; and wherein the ends of the legs have portions of increased thickness which are adapted to be engaged and retained by the interlocking elements.

2. The heat exchanger according to claim 1, wherein each of the gas flow passages is provided with a turbulence-enhancing insert;

wherein each of the turbulence-enhancing inserts comprises a corrugated fin defined by a plurality of parallel sidewalls extending along the length of the core, wherein the sidewalls have crests at their tops and bottoms at which they are joined to each other and to adjacent ones of said flat tubes, wherein each of the corrugated fins has a pair of side edges between which a width of the corrugated fin is defined, wherein at least one of the side edges of the corrugated fin is defined by an endmost sidewall of said corrugated fin, and wherein the endmost sidewall is substantially free of perforations and defines one of the opposed sides of one of the gas flow passages.

3. The heat exchanger according to claim 2, wherein each of the side edges of the corrugated fin is defined by one of said endmost sidewalls of the corrugated fin.

4. The heat exchanger according to claim 3, wherein each of said corrugated fins has a width which defines the width of the gas flow passage in which it is provided, such that each of the opposed sides of each of the gas flow passages is defined by one of the endmost sidewalls of said corrugated fin.

5. The heat exchanger according to claim 1, wherein each of the flat tubes comprises a pair of core plates having a planar peripheral flange surrounding a raised central area, and wherein said peripheral edges of the tubes are defined by portions of said planar peripheral flange extending along the length of the core; and wherein each of the raised central areas of the core plates and each of the liquid flow passages of the flat tubes have a width in the second portion of the core which is less than a width in the first portion of the core.

6. The heat exchanger according to claim 5, wherein the planar peripheral flanges include inwardly extending portions in the second portion of the core.

7. The heat exchanger according to claim 6, wherein the inwardly extending portions extend inwardly by a maximum amount which is substantially equal to a width of the planar peripheral flange along the first portion of the core; and wherein each of the inwardly extending portions includes an interlocking element which is adapted to engage and retain an inner edge of the side seal.

8. The heat exchanger according to claim 1, wherein the second portion of the core has a length which is less than a length of the first portion of the core; and wherein the second portion forms a recessed channel extending throughout substantially the entire height of the core.

9. The heat exchanger according to claim 1, wherein the core further comprises a top and a bottom, and wherein the housing includes a top cover provided over the top of the core, a bottom cover provided over the bottom of the core, and a pair of said side covers over the sides of the core.

10. The heat exchanger according to claim 9, wherein the bottom of the core is spaced from the bottom cover of the housing and a bottom seal is provided between the bottom of the core and the bottom cover of the housing.

11. The heat exchanger according to claim 10, wherein the top of the core is spaced from the top cover of the housing and a top seal is provided between the top of the core and the top cover of the housing.

12. The heat exchanger according to claim 1, wherein the seal is resilient and has an uncompressed thickness which is greater than said second gap.

13. The heat exchanger according to claim 11, wherein the side seals, the top seal and the bottom seal comprise a continuous seal member which extends along the top, bottom and sides of the core.

14. The heat exchanger according to claim 13, wherein all portions of the continuous seal lie in a single transverse plane.

15. The heat exchanger according to claim 14, wherein the continuous seal comprises an elongate, resilient member.

16. The heat exchanger according to claim 15, wherein the continuous seal includes wrappable corner portions which are adapted to wrap around corners between the sides and the adjoining top and bottom of the core;

wherein the wrappable corner portions comprise notches extending partly through the thickness of the continuous seal; and wherein the notches are V-shaped and are open toward the core.

17. The heat exchanger according to claim 1, wherein the heat exchanger includes two or more of said side seals, which are spaced apart along the length of the core, and wherein the core comprises two of said second portions in which the flat tubes have a second width which is substantially the same as the width of each of the gas flow passages.

18. The heat exchanger according to claim 1, wherein one of the opposed sides of each of the gas flow passages is defined by coolant inlet and outlet manifolds of the core.

* * * * *